(12) United States Patent
Sudo et al.

(10) Patent No.: US 8,401,203 B2
(45) Date of Patent: Mar. 19, 2013

(54) INFORMATION PROCESSING APPARATUS AND PROGRAM

(75) Inventors: Takashi Sudo, Tokyo (JP); Kimio Miseki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1510 days.

(21) Appl. No.: 11/947,683

(22) Filed: Nov. 29, 2007

(65) Prior Publication Data
US 2008/0130907 A1 Jun. 5, 2008

(30) Foreign Application Priority Data
Dec. 1, 2006 (JP) .................................. 2006-325997

(51) Int. Cl.
*H04B 3/20* (2006.01)
(52) U.S. Cl. ........................................ 381/66; 381/318
(58) Field of Classification Search .................... 381/66, 381/318
See application file for complete search history.

(56) References Cited

U.S. PATENT DOCUMENTS
2008/0085009 A1* 4/2008 Merks et al. ................... 381/66
2008/0192945 A1* 8/2008 Mcconnell ..................... 381/66
2008/0260172 A1* 10/2008 Sakuraba et al. ............... 381/66

FOREIGN PATENT DOCUMENTS
JP 6-326761 11/1994
JP 2001-136239 5/2001
JP 2001-267974 9/2001
JP 2003-517782 5/2003

OTHER PUBLICATIONS
Japanese Office Action mailed Mar. 1, 2011 in Japanese Application No. JP 2006-325997.

* cited by examiner

*Primary Examiner* — Phat X Cao
(74) *Attorney, Agent, or Firm* — Knobbe, Martens, Olson & Bear LLP

(57) ABSTRACT

According to one embodiment, An information processing apparatus includes a first signal input unit configure to receive a first signal, a second signal input unit configure to receive a signal, a first control unit configure to acquire system resources, a second control unit configure to select, in accordance with information of the system resources acquired by the first control unit, a processing method for suppressing at least one of echo and noise of the second signal input from the second signal input unit containing the echo due to the first signal input from the first signal input unit, a third control unit configure to generate an output signal by suppressing at least one of the echo and the noise from the second signal by the processing method selected by the second control unit, and a signal output unit configure to output the output signal generated by the third control unit.

10 Claims, 22 Drawing Sheets

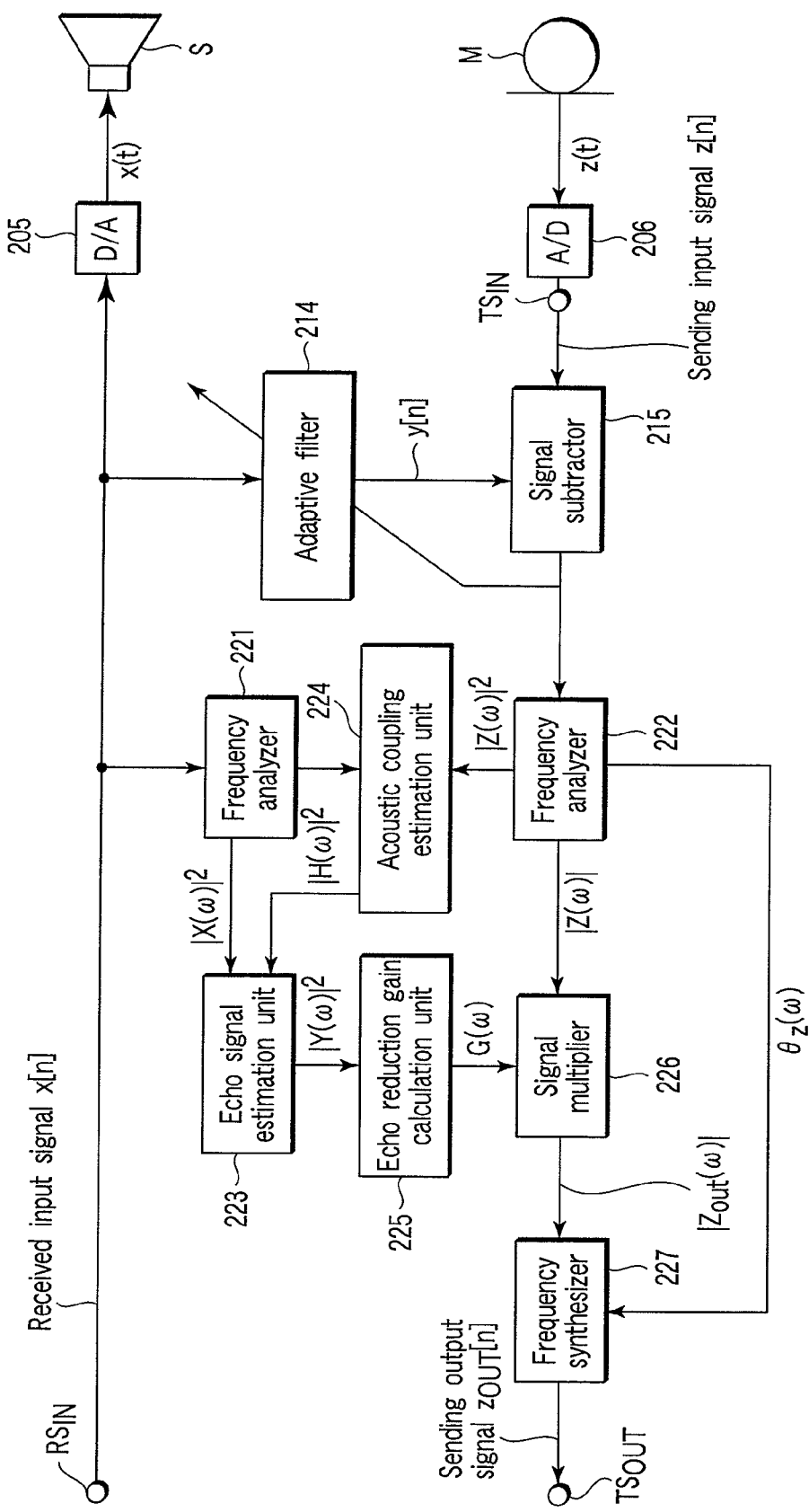
F I G. 9

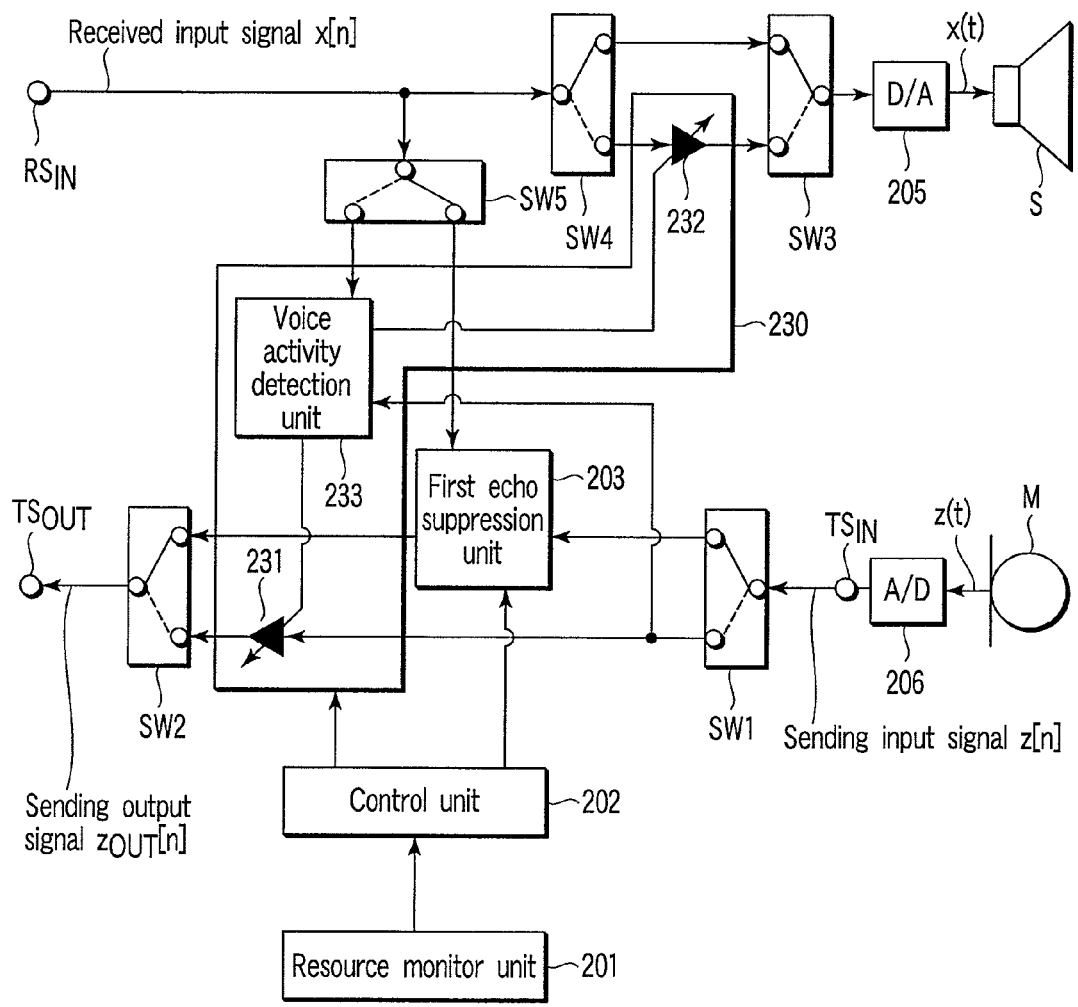
F I G. 12

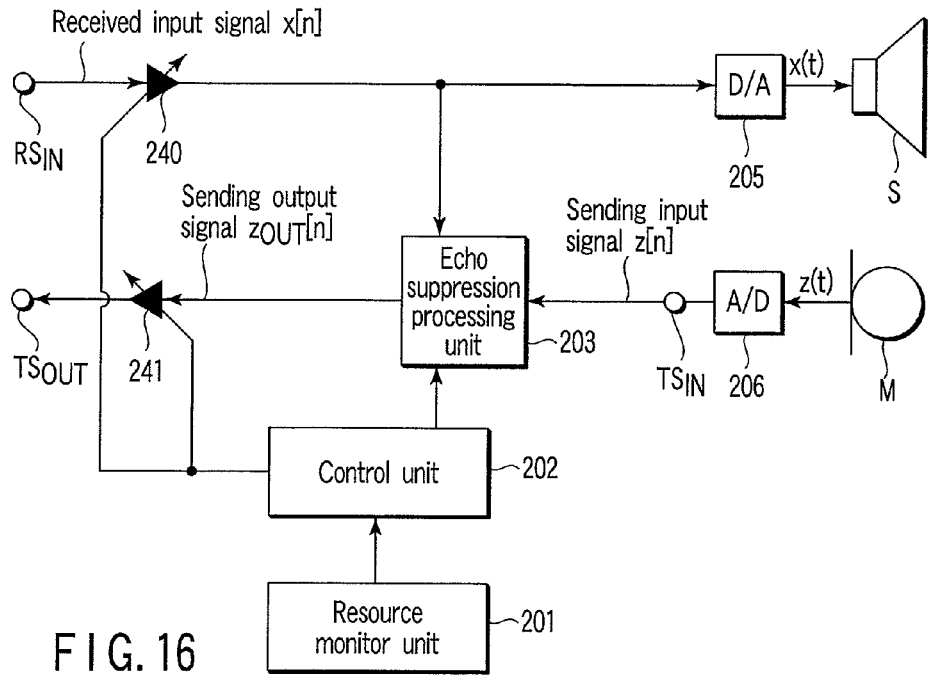
F I G. 16
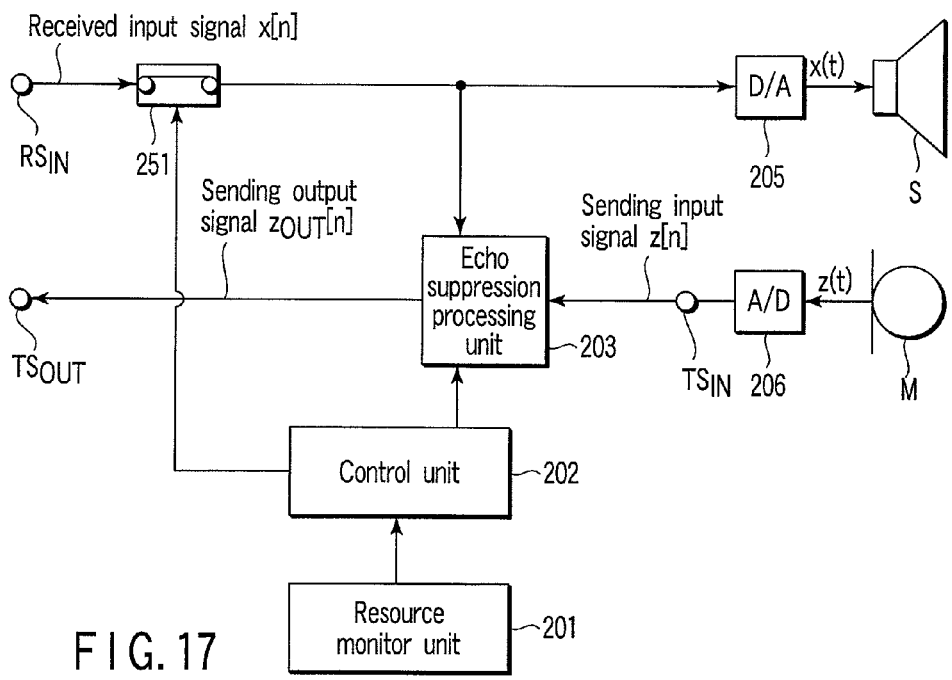
F I G. 17

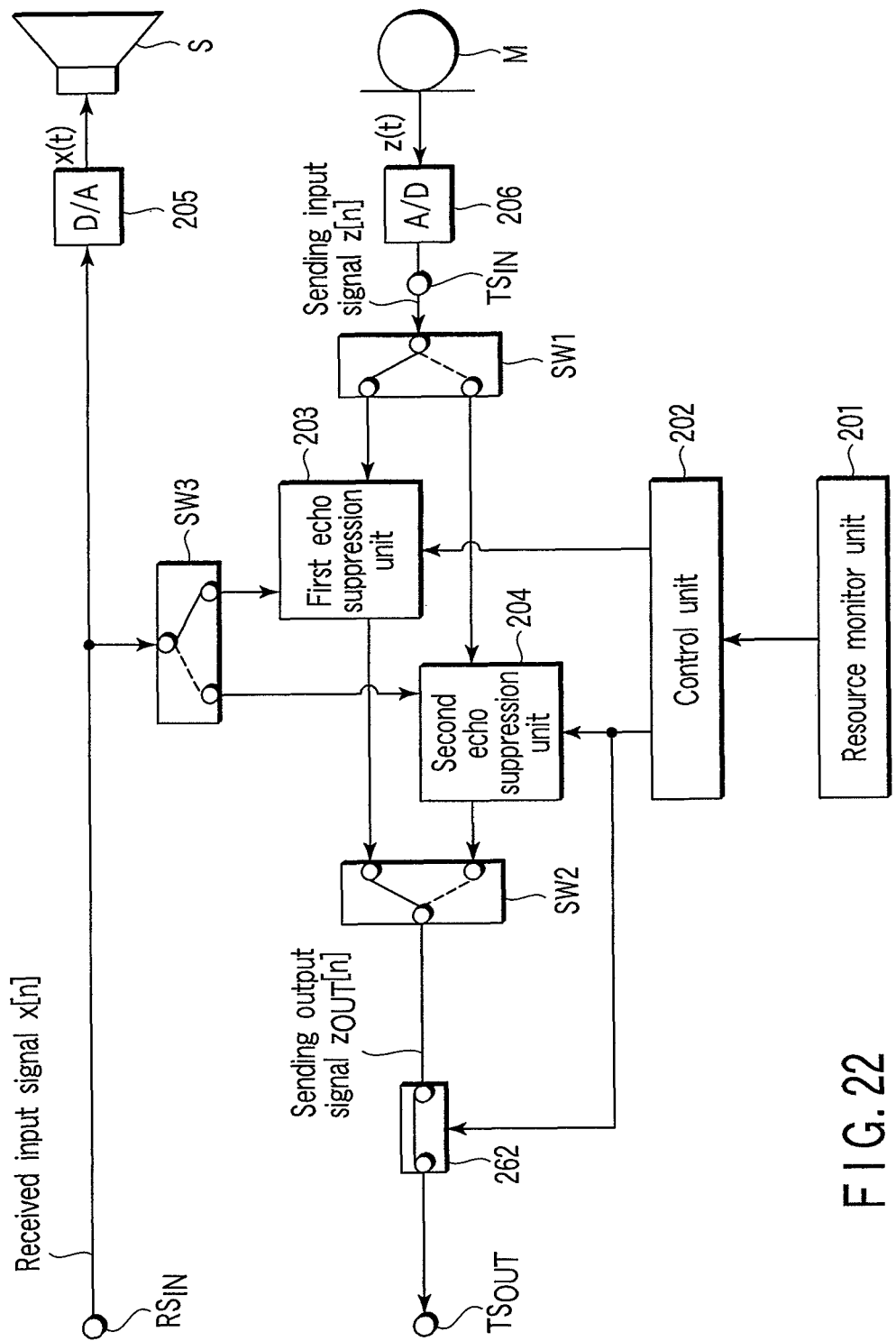
F I G. 22

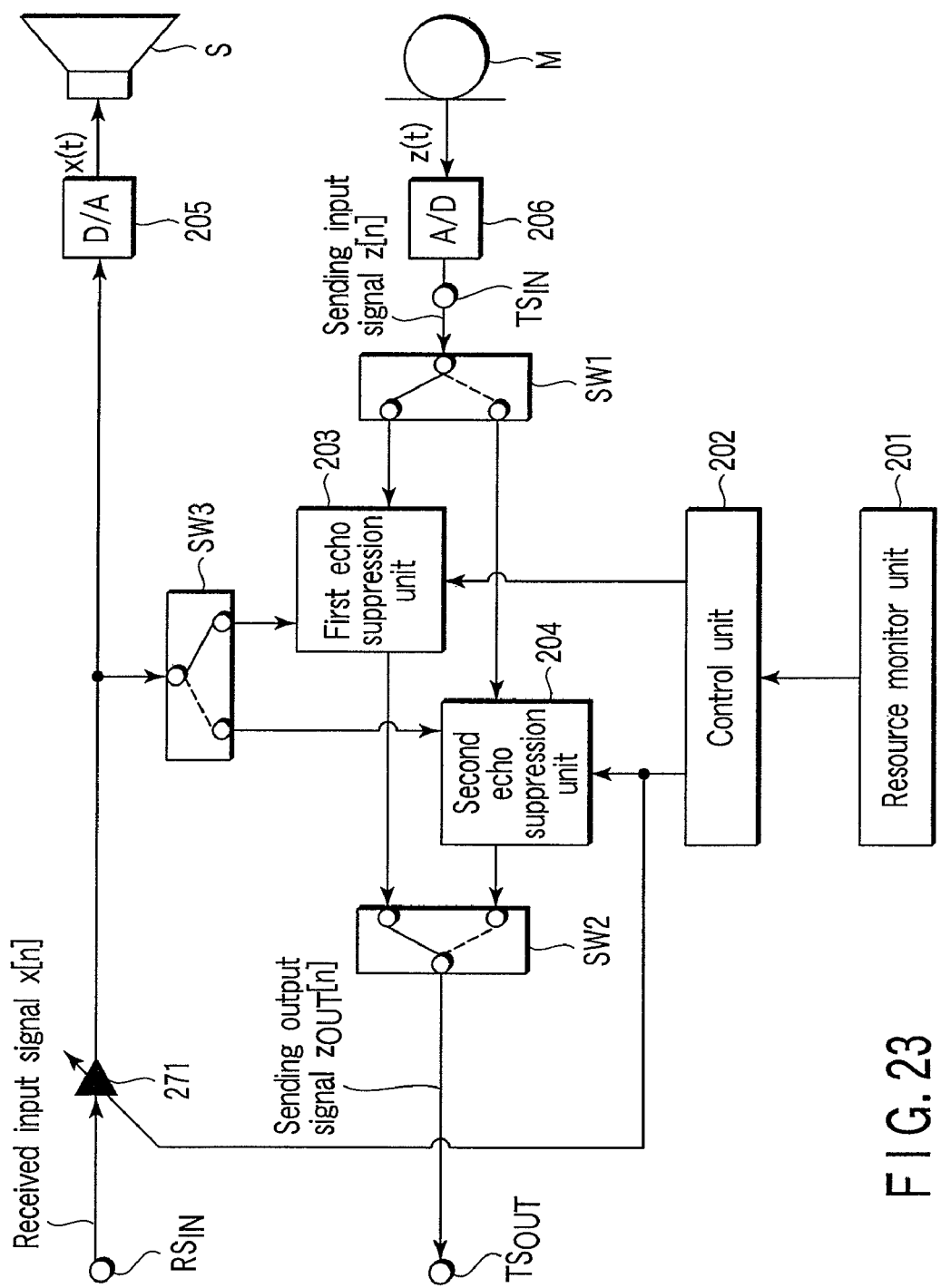
F I G. 23

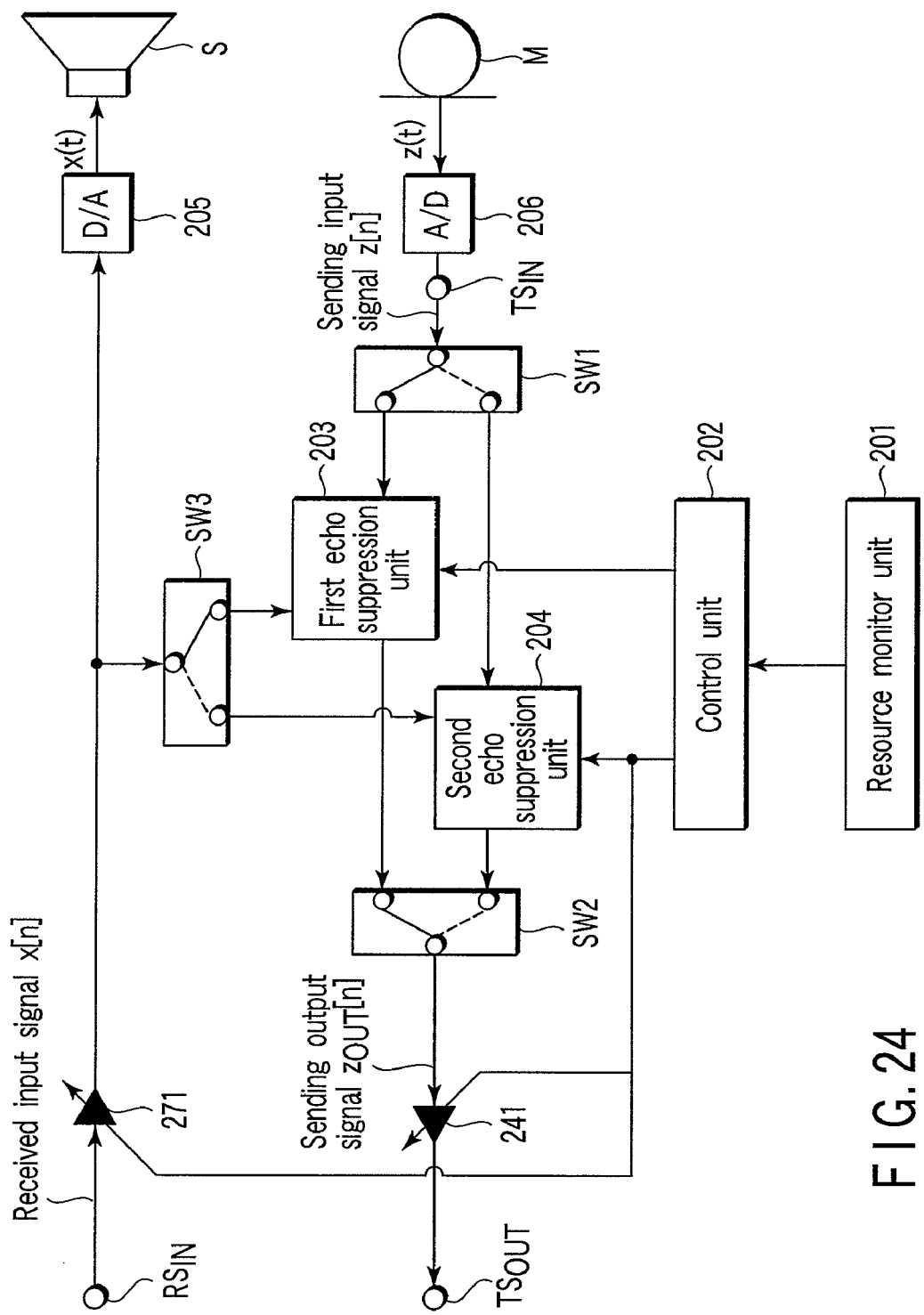
F I G. 24

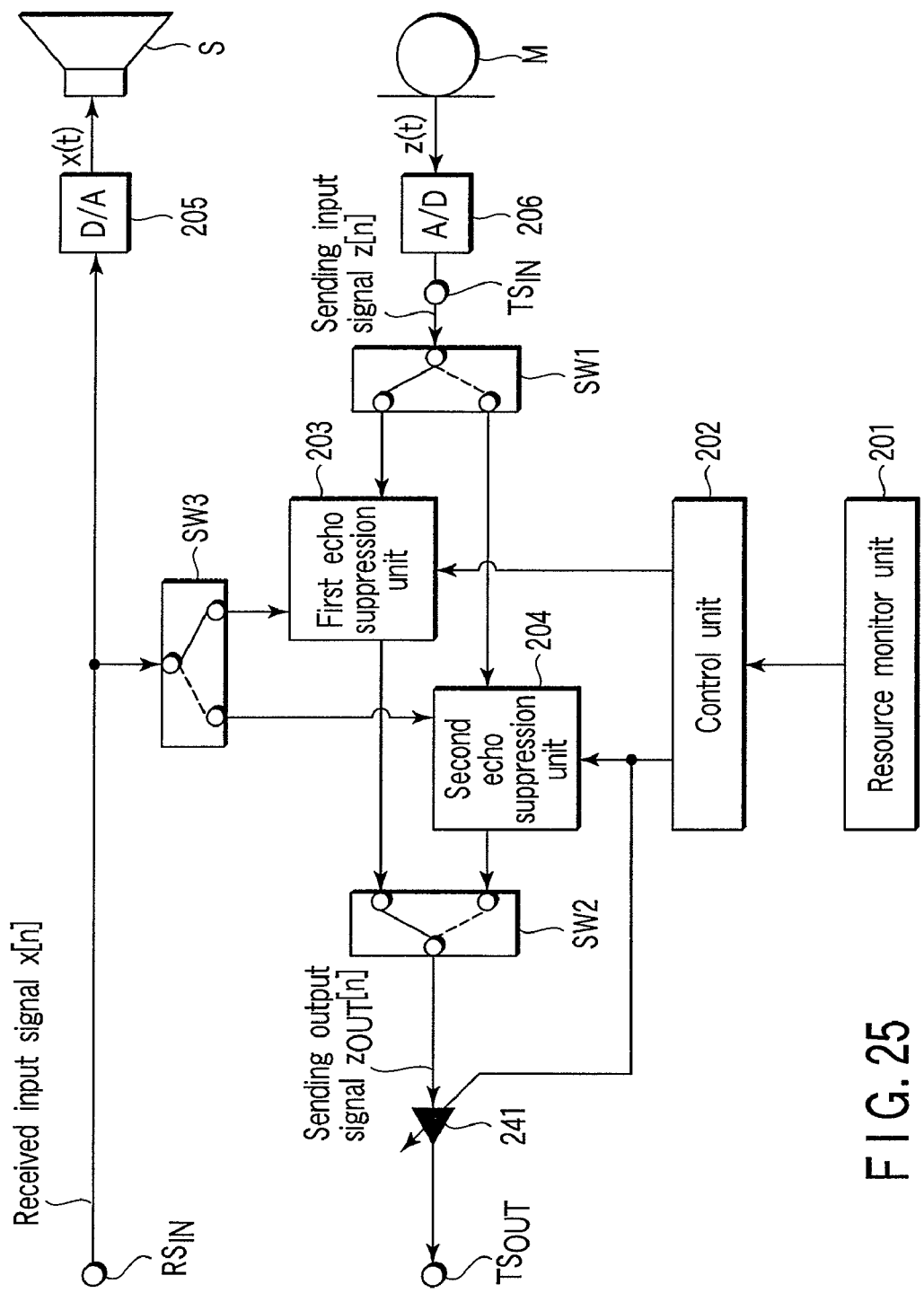
F I G. 25

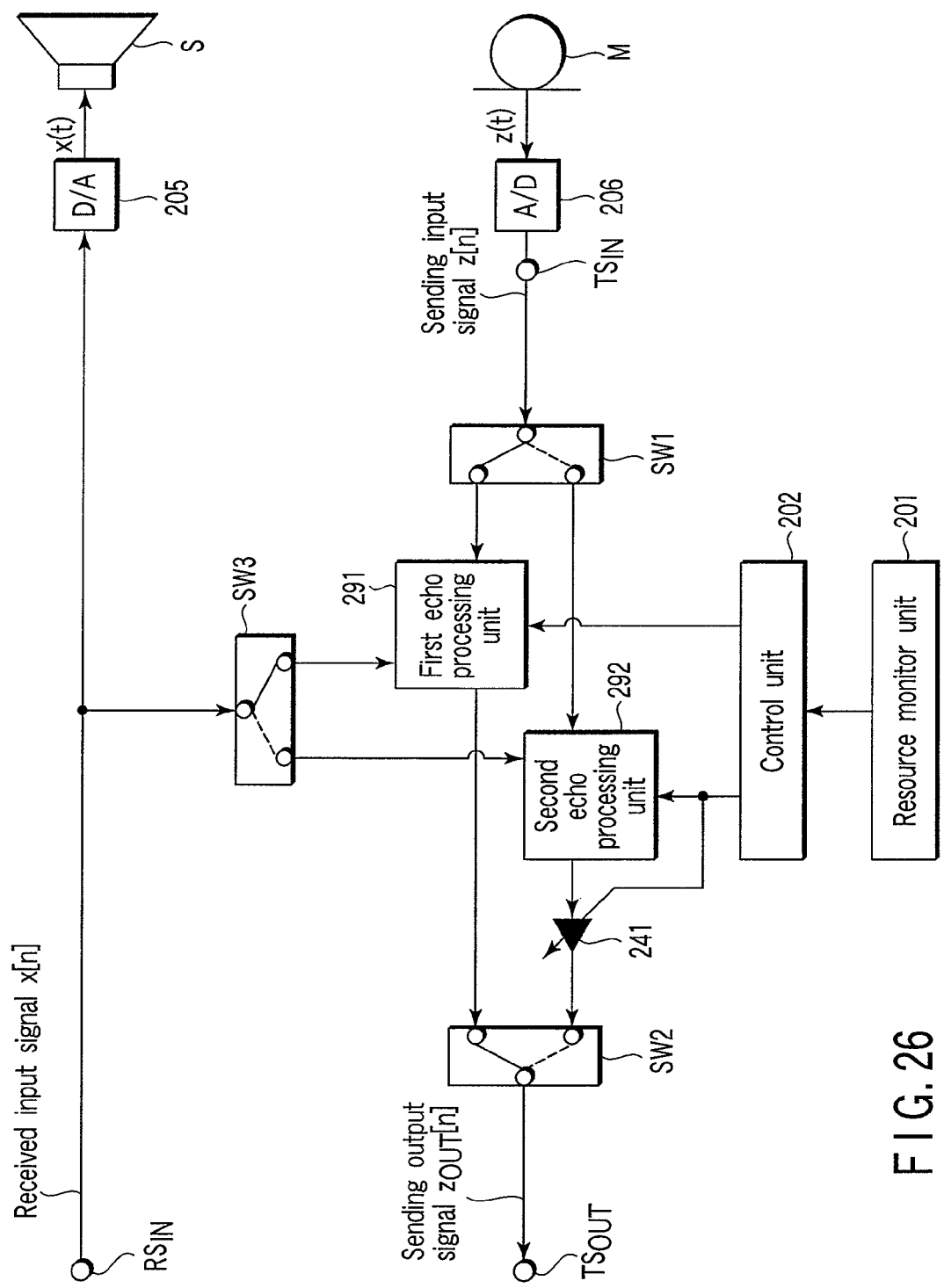
F I G. 26

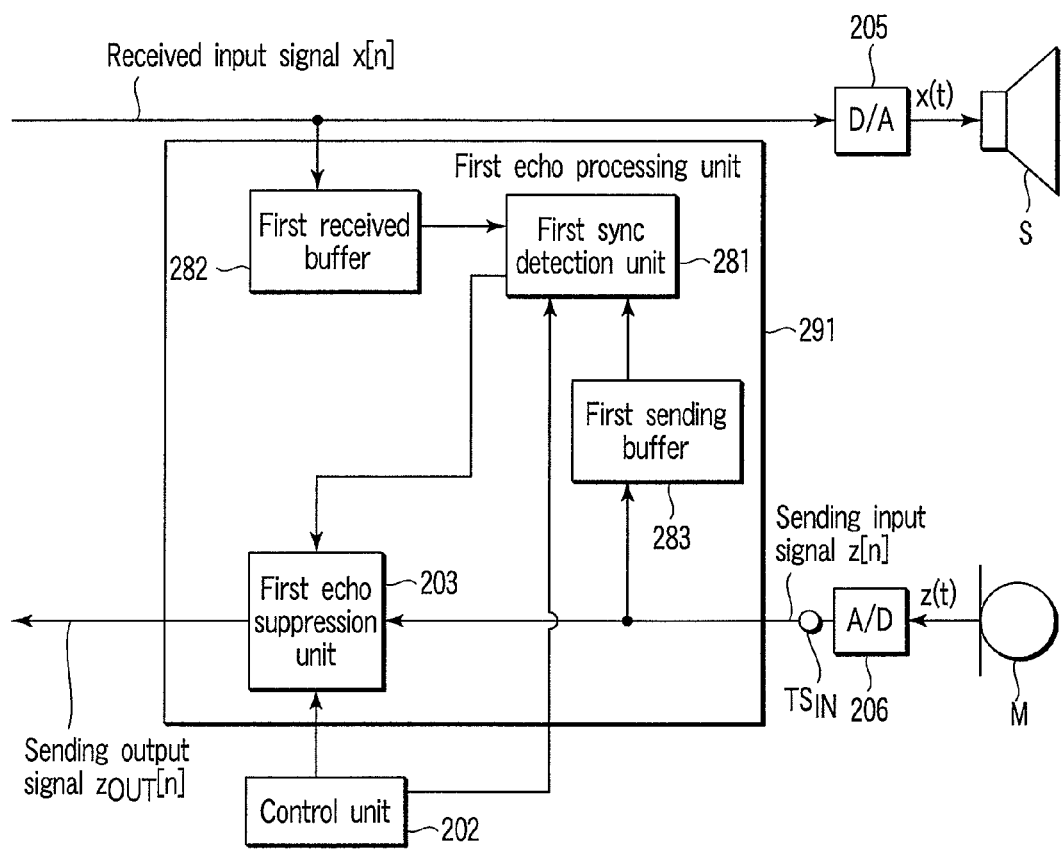
F I G. 27

_US 8,401,203 B2_

INFORMATION PROCESSING APPARATUS AND PROGRAM

CROSS-REFERENCE TO RELATED APPLICATIONS

This application is based upon and claims the benefit of priority from Japanese Patent Application No. 2006-325997, filed Dec. 1, 2006, the entire contents of which are incorporated herein by reference.

BACKGROUND

1. Field

One embodiment of the invention relates to an information processing apparatus and a program, and particularly to a process for improving the quality of a speech signal.

2. Description of the Related Art

With the recent increase in the processing capacity of personal computers and the communication speed, the voice telephone call service using VoIP (voice over internet protocol) on personal computers is increasing.

In the VoIP using the computers, a program is executed by a CPU. The process executed by the program includes the echo suppression (Jpn. Pat. Appln. KOKAI Publication No. 2003-517782).

In the communication apparatus using a multitask system like the personal computer, the large processing burden on the processor, the processor clock shift and the large burden of the data access process on a memory device lead to the lack of uniformity of the timing of access to the memory device. Even in the same call, therefore, the synchronization between a sending input signal and a received input signal develops a fluctuation. This sync fluctuation causes the erroneous process of echo suppression and thus poses a problem of generating noises and distortions in a sending output signal or otherwise deteriorating the quality of the speech signal.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 9 is an exemplary block diagram showing the configuration of the echo suppression unit including the echo canceller of FIG. 7 and the echo reduction of FIG. 8 combined;

FIG. 12 is an exemplary block diagram showing the configuration of an echo suppression unit according to a second embodiment;

FIG. 16 is an exemplary block diagram showing the configuration of the echo suppression unit according to a modification of the third embodiment;

FIG. 17 is an exemplary block diagram showing the configuration of an echo suppression unit according to a fourth embodiment;

FIG. 22 is an exemplary block diagram showing the configuration of the echo suppression unit according to a modification of the fifth embodiment;

FIG. 23 is an exemplary block diagram showing the configuration of an echo suppression unit according to a sixth embodiment;

FIG. 24 is an exemplary block diagram showing the configuration of the echo suppression unit according to a modification of the sixth embodiment;

FIG. 25 is an exemplary block diagram showing the configuration of the echo suppression unit according to a modification of the sixth embodiment;

FIG. 26 is an exemplary block diagram showing the configuration of an echo suppression unit according to a seventh embodiment;

FIG. 27 is an exemplary block diagram showing the configuration of a first echo processing unit shown in FIG. 26.

DETAILED DESCRIPTION

Various embodiments according to the invention will be described hereinafter with reference to the accompanying drawings. In general, according to one embodiment of the invention, an information processing apparatus comprises a first signal input unit configure to receive a first input signal, a second signal input unit configure to receive a second signal, a first control unit configure to acquire system resources, a second control unit configure to select, in accordance with information of the system resources acquired by the first control unit, a processing method for suppressing at least one of echo and noise of the second input signal input from the second signal input unit containing the echo due to the first input signal input from the first signal input unit, a third control unit configure to generate an output signal by suppressing at least one of the echo and the noise from the second input signal by the processing method selected by the second control unit, and a signal output unit configure to output the output signal generated by the third control unit.

Embodiments of the invention will be explained below with reference to the drawings.

Figure 1:
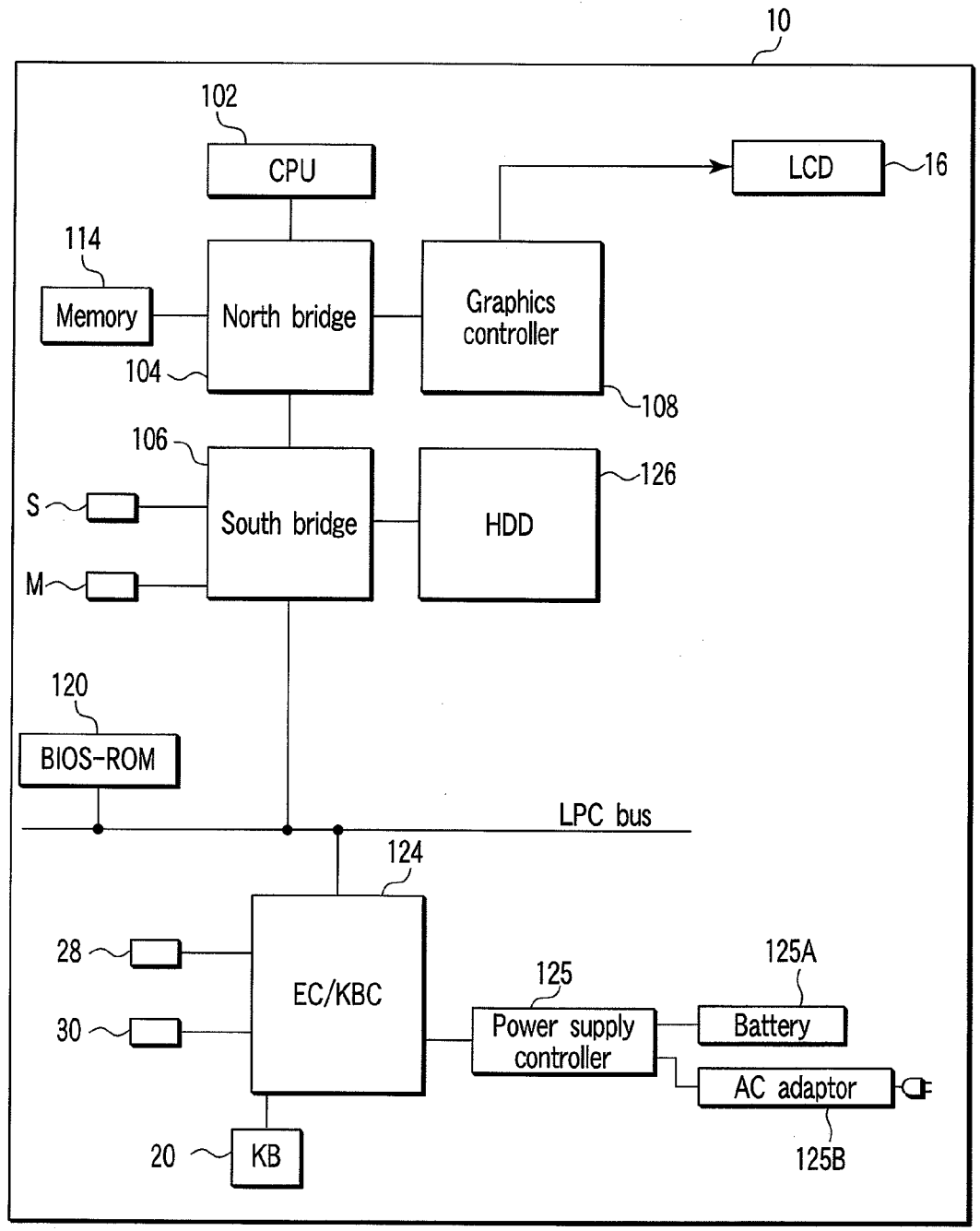
FIG. 1 is an exemplary block diagram showing the general configuration of a personal computer as an information processing apparatus according to a first embodiment.

FIG. 1 is a block diagram showing a general configuration of a personal computer serving as an information processing apparatus according to a first embodiment of the invention.

A computer 10, as shown in FIG. 1, includes a CPU 102, a north bridge 104, a main memory 114, a graphics controller 108, a south bridge 106, a BIOS-ROM 120, a hard disk drive (HDD) 126, an embedded controller/keyboard controller IC (EC/KBC) 124 and a power supply controller 125.

The CPU 102 is a processor for controlling the operation of the computer, and executes the operating system (OS) and the various application programs loaded from the hard disk drive (HDD) 126 to the main memory 114.

Also, the CPU 102 executes the system BIOS (Basic Input/Output System) stored in the BIOS-ROM 120 after being loaded in the main memory 114. The system BIOS is a program for controlling the hardware.

The north bridge 104 is a bridge device for connecting the local bus of the CPU 102 and the south bridge 106. The north bridge 104 has also built therein a memory controller for controlling the access to the main memory 114. Also, the north bridge 104 has the function of executing the communication with the graphics controller 108 through an AGP (Accelerated Graphics Port) bus or the like.

The south bridge 106 has the function as an audio controller including the function of converting a digital speech or audio signal into an analog signal (D/A converter) and the function of converting the analog speech or audio signal input from a microphone M into a digital signal (A/D converter). The analog signal converted by the D/A converter is output from a speaker S.

The graphics controller 108 is a display controller for controlling an LCD 16 used as a display monitor of the computer. The graphics controller 108 has a video memory (VRAM) and generates a video signal to form a display image to be displayed on the LCD 16 from the display data drawn in the video memory according to the OS/application program. The video signal generated by the graphics controller 108 is output to the line.

The embedded controller/keyboard controller IC 124 functions as a controller for controlling a touch pad 22 as input means, a scroll button 24 and a touch pad control button 26. The embedded controller/keyboard controller IC 124 is a one-chip microcomputer for monitoring and controlling various devices (peripheral devices, sensors, power circuit, etc.) regardless of the system condition of the computer 10.

The power supply controller 125 generates a system power to be supplied to each component of the computer 10 using the external power, if any, supplied from an AC adaptor 125B. In the case where the external power is not supplied through the AC adaptor 125B, on the other hand, the system power to be supplied to each component of the computer 10 is generated using a battery 125A.

The personal computer 10 described above carries out the voice telephone call service using VoIP (voice over internet protocol). At the time of the voice telephone call service using VoIP, the computer 10 executes the process of suppressing the echo component contained in the sending input signal.

Figure 2:
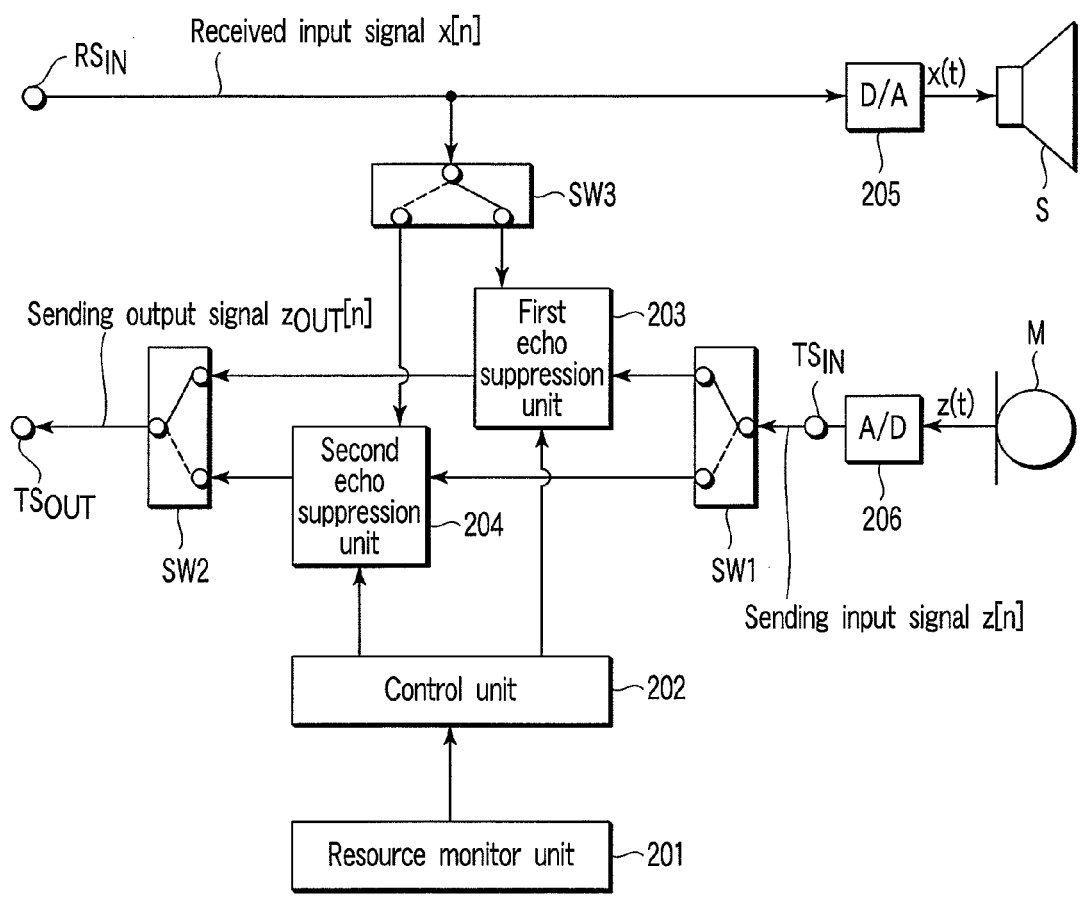
FIG. 2 is an exemplary block diagram showing the configuration of an echo suppression unit according to the first embodiment.

FIG. 2 is a block diagram showing the configuration of an echo suppression unit according to the first embodiment.

This echo suppression unit includes a resource monitor unit 201, a control unit 202, a first echo suppression unit 203, a second echo suppression unit 204, a D/A converter 205 for converting a received input signal x[n] into an analog signal to output the received speech of a far-end speaker from the speaker S, an A/D converter 206 for converting a sending input signal z(t) (including a sending speech signal s(t) making up the speech of a near-end speaker, an echo component b(t) that feedback signal is such that the output signal from the speaker S has input into the microphone M, and a noise component n(t) making up the surrounding noises) constituting the analog signal input from the microphone M into the sending input signal z[n] making up the digital signal, a received speech signal input unit $RS_{IN}$ supplied with the received input signal x[n], a sending speech signal input unit $TS_{IN}$ supplied with the sending input signal z(t) and a sending speech signal output unit $TS_{OUT}$ for outputting a sending output signal $z_{OUT}[n]$.

The resource monitor unit 201, the control unit 202, the first echo suppression unit 203 and the second echo suppression unit 204 are the software executed by the CPU 102. The character t in the small parentheses designates the time of the analog signal, and the character n in the large parentheses the time of the digital signal. This is also the case with the drawings and description that follow.

The signals are processed by software. Therefore, the switches SW1 to SW3, though not really existent in FIG. 2, are shown to indicate the difference in signal flow.

The resource monitor unit 201 monitors the computational load of the processor, the processing load of the memory device and the remaining battery capacity. The control unit 202 controls the operation of the first echo suppression unit 203 and the second echo suppression unit 204 in accordance with the result of monitoring by the resource monitor unit 201. The first echo suppression unit 203 and the second echo suppression unit 204 suppress the echo by the signal processing, etc. in accordance with the control operation of the control unit 202.

Figure 3:
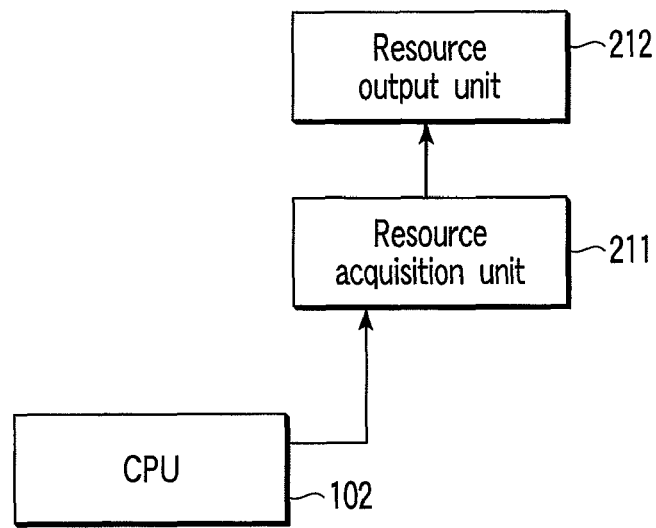
FIG. 3 is an exemplary block diagram showing the configuration of a resource monitor unit according to the first embodiment.
Figure 4:
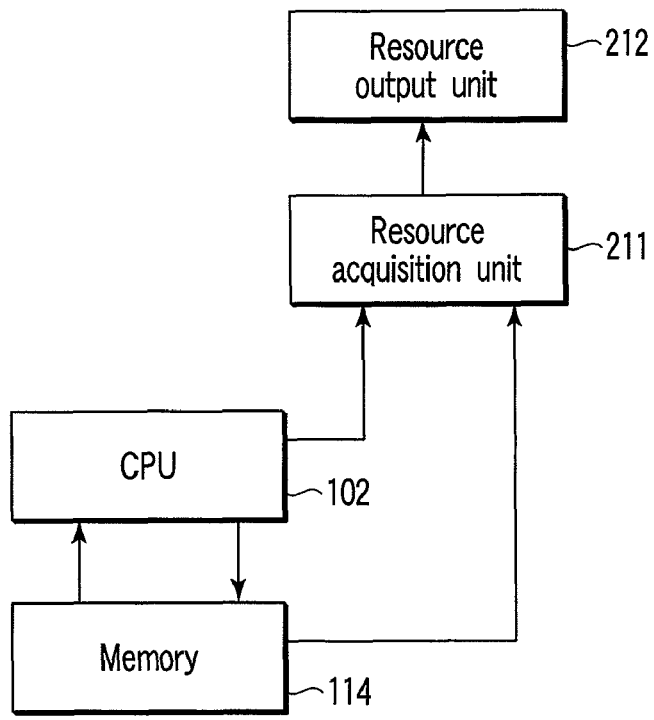
FIG. 4 is an exemplary block diagram showing the configuration of the resource monitor unit according to the first embodiment.
Figure 5:
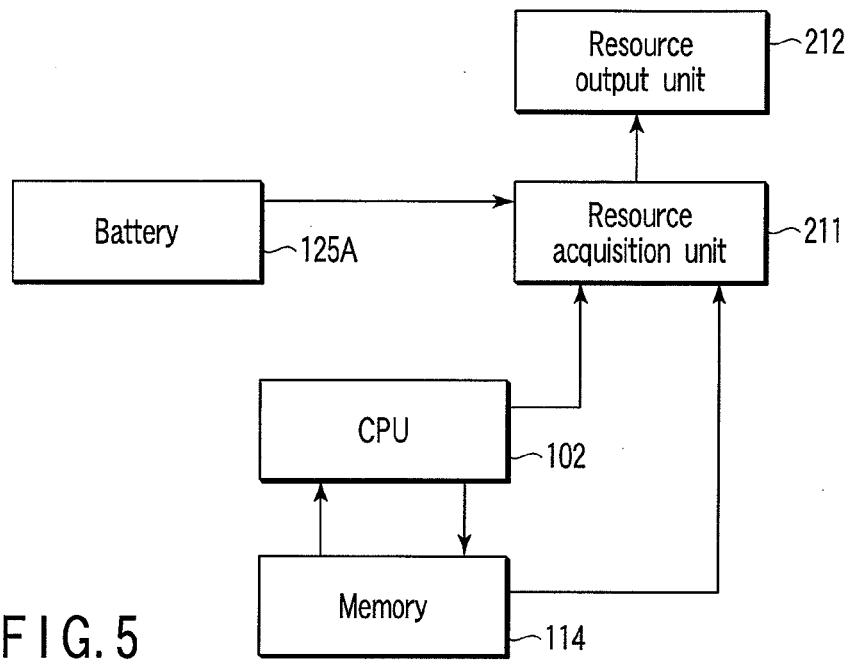
FIG. 5 is an exemplary block diagram showing the configuration of the resource monitor unit according to the first embodiment.

The resource monitor unit 201, as shown in FIGS. 3, 4, and 5, includes a resource acquisition unit 211 for acquiring the operation information from the CPU 102, or the CPU 102 and the memory 114, or the CPU 102, the memory 114 and the battery 125A, respectively, and a resource output unit 212 for outputting the information of the system resource corresponding to the operation information acquired by the resource acquisition unit 211.

Once the system resource amount runs short, the timing of accessing the memory 114 storing the received input signal x[n] and the sending input signal z[n] lacks uniformity, and the synchronization between the received input signal x[n] and the sending input signal z[n] fluctuates even in the same call. This sync fluctuation causes an error in the echo suppression process and a jarring and unnecessary noise occurs in the sending output signal $z_{OUT}[n]$.

In the case where the resources run short, for example, the access to the memory 114 is delayed and lacks uniformity. In the case where the used capacity of the memory 114 increases, on the other hand, the process for increasing the available capacity is executed, resulting in the lack of uniformity of access to the memory 114. Also, with the reduction in the remaining capacity of the battery, the operating frequency of the CPU 102 is automatically decreased and the processing speed runs short, so that the access to the memory 114 is delayed, also resulting in the lack of uniformity in the access to the memory 114.

The first echo suppression unit 203 suppresses the echo by the process of the echo canceller (EC) using an adaptive filter, for example, or a combined process of the echo canceller (EC) using the adaptive filter and the echo reduction (ER) in frequency domain. Also, the second echo suppression unit 204 suppresses the echo by the process of the echo reduction (ER) in frequency domain. The conventional technique with the echo canceller using the adaptive filter is described in, for example, Jpn. Pat. Appln. KOKAI Publication No. 2002-290286. Also, the echo reduction in frequency domain is described in, for example, Japanese Patent No. 3420705.

Figure 6:
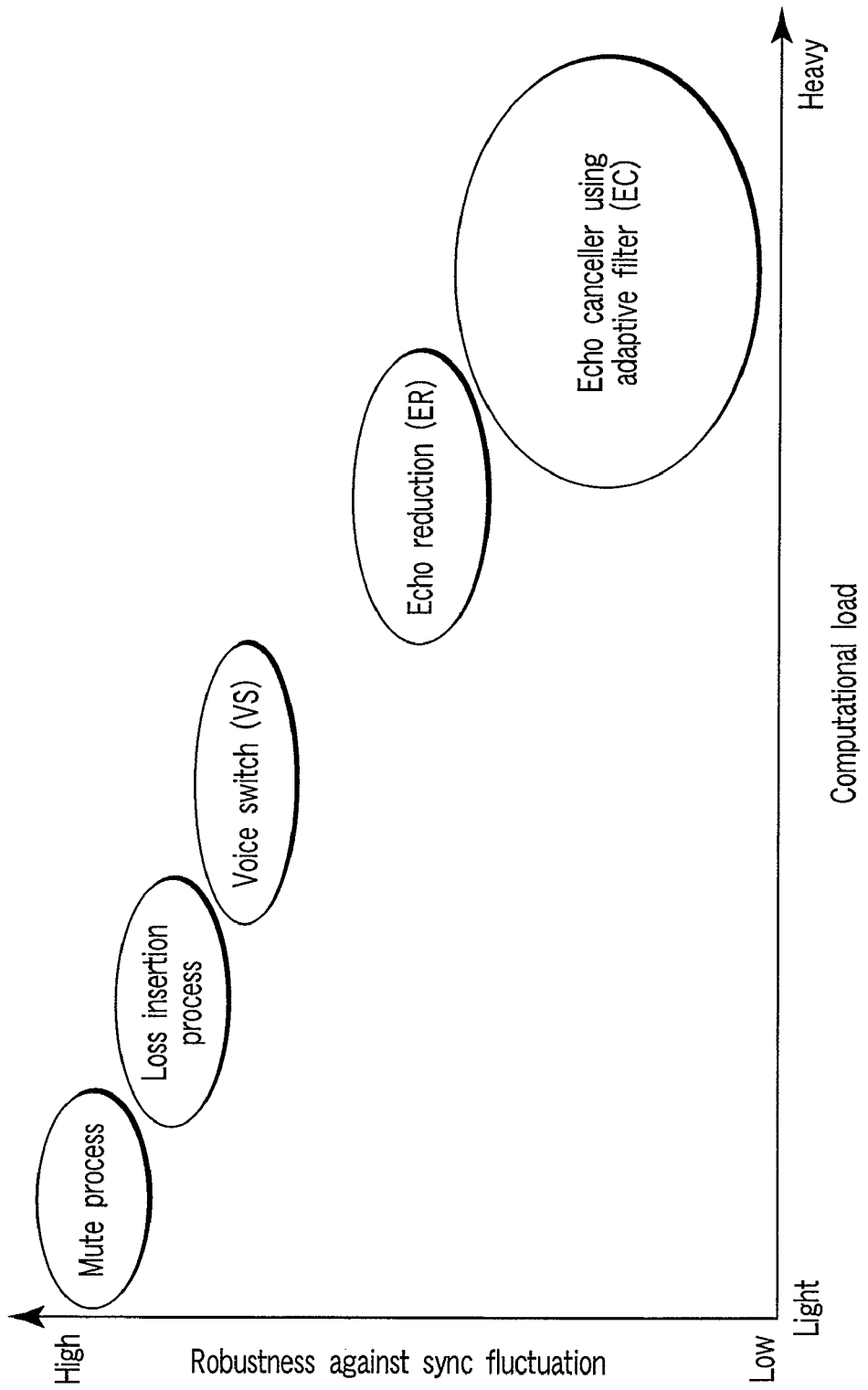
FIG. 6 is an exemplary diagram showing the relation between the robustness against the sync fluctuation and the computational load.

This embodiment represents an example of the time-domain adaptive filter as the echo canceller. Generally, however, the adaptive filter in time domain, as compared with the echo reduction in frequency domain, increases the computational load and the load of the CPU 102. Thus, the speech quality is high due to a small deterioration of the sending speech, and the robustness is low against the sync fluctuation between the received input signal x[n] and the sending input signal z[n]. With regard to the main echo suppression processing methods, the relation between the robustness against the sync fluctuation and the computational load is shown in FIG. 6.

Figure 7:
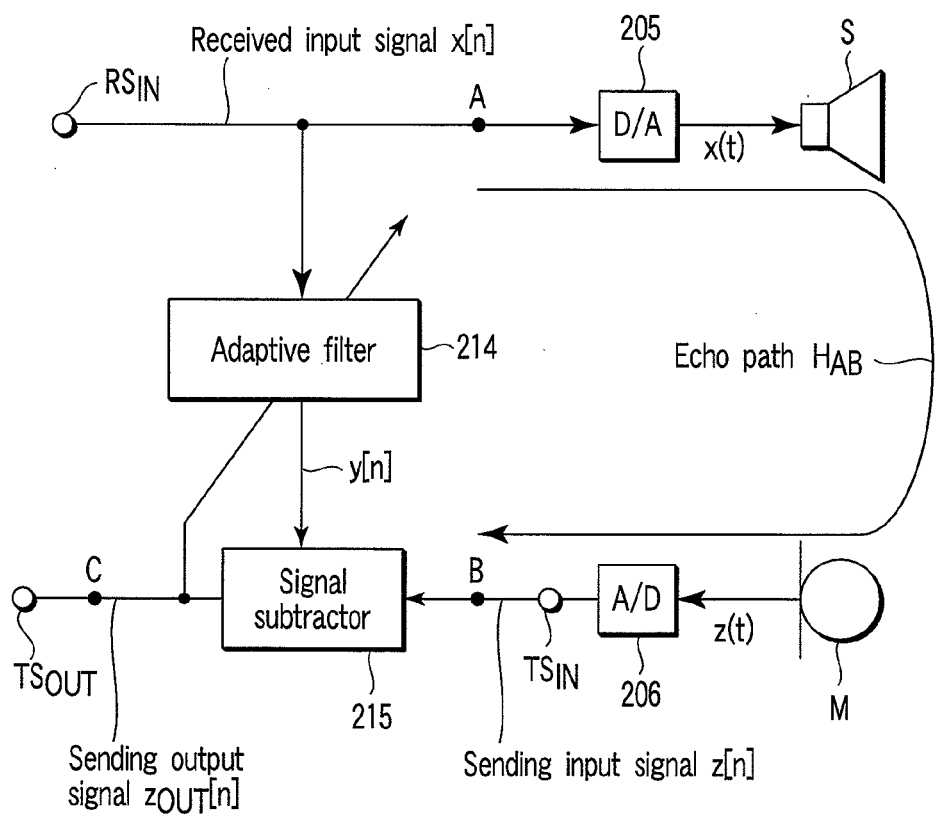
FIG. 7 is an exemplary block diagram showing the configuration of an echo canceller according to the first embodiment.
Figure 8:
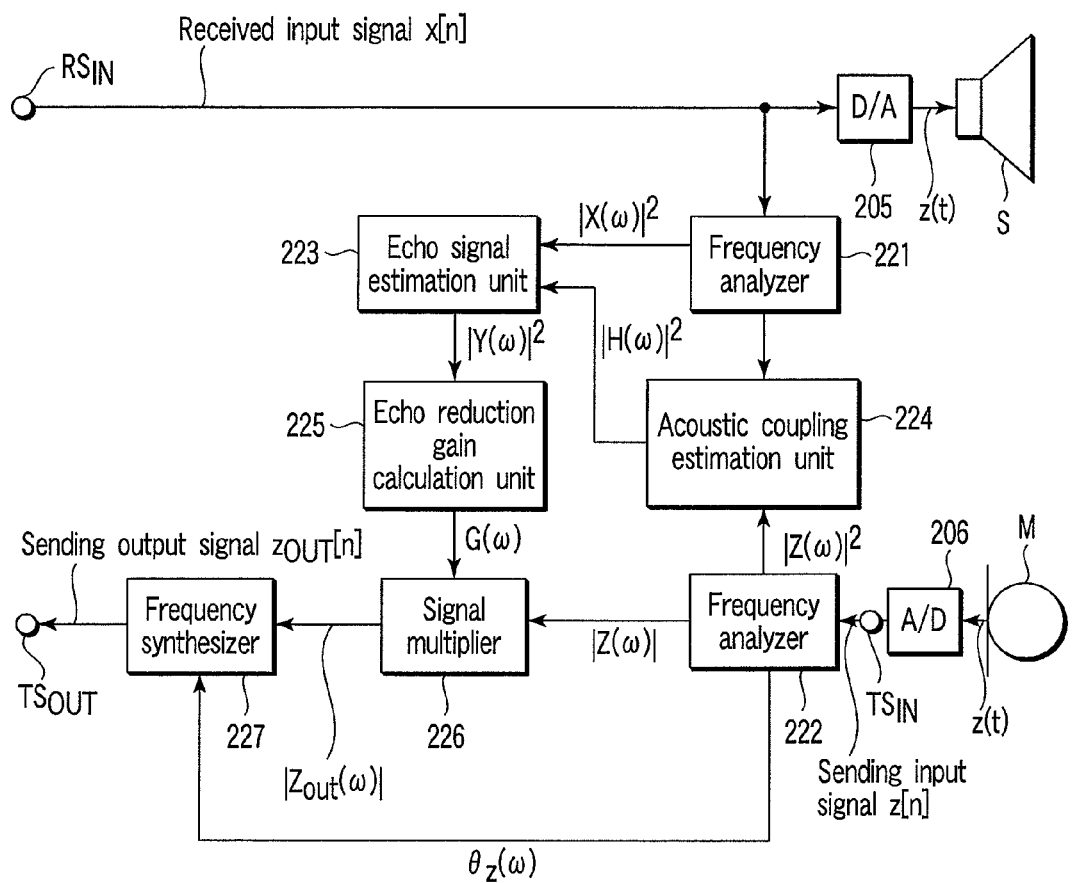
FIG. 8 is an exemplary block diagram showing the configuration of an echo reduction according to the first embodiment.

The configurations of the echo canceller and the echo reduction will be explained with reference to FIGS. 7 and 8, respectively.

First, with reference to FIG. 7, the configuration of the echo canceller will be explained.

The echo canceller includes the adaptive filter 214 and the signal subtractor 215. The adaptive filter 214 estimates the echo component b(t) using the received input signal x[n] constituting an input signal to an echo path in order to adaptively identify an impulse response h(t) of the echo path $H_{AB}$ (the path from point A to point B in FIG. 7) formed by the acoustic coupling of the speaker S and the microphone M. The signal subtractor 215 subtracts the echo component y[n] estimated by the adaptive filter 214 from the sending input signal z[n] constituting the output signal from the echo path.

The adaptive filter 214, supplied with the received input signal x[n] input from the far-end side and the sending output signal $z_{OUT}[n]$ (the signal at point C in FIG. 7) constituting the output signal of the signal subtractor 215, determines the filter coefficient from time to time with the processor having a variable filter coefficient using a well known algorithm. The adaptive filter 214 adaptively updates the variable filter coefficient according to, for example, the NLMS (the Normalized-Least-Mean-Square) algorithm for minimizing the root-mean-square value of the sending output signal $z_{OUT}[n]$ output from the signal subtractor 215 during the single-talk section of the far-end speaker. In this case, the single-talk is the period when the received input signal contains a speech from the far-end speaker and the sending input signal z[n] does not contain the sending speech signal s[n] from the near-end speaker. This is also the case with the drawings and the description that follow. Then, the adaptive filter 214, by the convolution of the filter coefficient and the received input signal x[n], estimates the echo component of the echo path $H_{AB}$ (the feedback component of the received input signal x[n] through the echo path $H_{AB}$).

Then, the signal subtractor 215 calculates the sending output signal $z_{OUT}[n]$ by subtracting the echo component y[n] estimated by the adaptive filter 214 from the sending input signal z[n]. By the calculation of the sending output signal $z_{OUT}[n]$ through the signal subtractor 215, only the echo component y[n] contained in the sending input signal z[n] is reduced but not the components other than the echo collected by the microphone M (the sending speech signal s[n] issued from the near-end speaker to the microphone M and the surrounding noise component n[n]).

Next, the configuration of the echo reduction will be explained with reference to FIG. 8.

A first frequency analyzer 221 transforms from the received input signal x[n] into the frequency spectrum by fast Fourier transform (FFT), and outputs the square of the amplitude spectrum as a power spectrum of the received speech signal $|X(\omega)|^2$ to an acoustic coupling estimation unit 224 and an echo signal estimation unit 223. In this case, the character $\omega$ in the small parenthesis indicates the frequency bin or the index of the grouped frequency band of the digital signal. This is also the case with the drawings and the description that follow.

A second frequency analyzer 222 transforms from the sending input signal z[n] into the frequency spectrum by FFT, and outputs an amplitude spectrum $|Z(\omega)|\omega$ to a signal multiplier 226 and the square of the amplitude spectrum as a power spectrum of the sending speech signal $|Z(\omega)|^2$ to the acoustic coupling estimation unit 224. Also, the second frequency analyzer 222 outputs a phase spectrum $\theta_Z(\omega)$ into that the second frequency analyzer 222 transformed from the sending input signal z[n] by FFT to a frequency synthesizer 227.

The acoustic coupling estimation unit 224 calculates an acoustic coupling $|H(\omega)|^2$, i.e. the square of the amplitude spectrum of the impulse response h(t) of the echo path from the power spectrum of the received speech signal $|X(\omega)|^2$ and the power spectrum of the sending speech signal $|Z(\omega)|^2$ in the signal talk section of the far-end speaker as $|Z(\omega)|^2/|X(\omega)|^2$, and outputs it to the echo signal estimation unit 223.

The echo signal estimation unit 223 multiplies the power spectrum of the received speech signal $|X(\omega)|^2$ at the present time by the acoustic coupling $|H(\omega)|^2$, and calculates by estimation the square of an amplitude spectrum $Y(\omega)$ of the echo component y[n] as a power spectrum of predicted echo signal $|Y(\omega)|^2$, and outputs it to an echo reduction gain calculation unit 225.

The echo reduction gain calculation unit 225 calculates an echo reduction gain $G(\omega)$ according to the spectrum subtraction method or the like using the power spectrum of predicted echo signal $|Y(\omega)|^2$, and outputs the result to a signal multiplier 226.

The signal multiplier 226 multiplies the amplitude spectrum $|Z(\omega)|$ of the sending input signal z[n] by the echo reduction gain $G(\omega)$, and outputs an amplitude spectrum of the process signal with the echo suppressed $|Z_{OUT}(\omega)|$ to the frequency synthesizer 227.

Also, in the frequency synthesizer 227, the sending output signal $z_{OUT}[n]$ constituting a time signal with the echo signal y[n] suppressed and the sending speech signal s[n] emphasized, is output to the transmission path by the inverse Fourier transform using the amplitude spectrum of the process signal with the echo suppressed $|Z_{OUT}(\omega)|$ and the phase spectrum $\theta_Z(\omega)$.

Incidentally, as shown in FIG. 9, in the case where the first echo suppression unit 203 executes a combination of the process of the echo canceller using the adaptive filter and the echo reduction in frequency domain, the echo reduction process is executed on the signal processed by the echo canceller.

Specifically, in the echo reduction in frequency domain combined with the echo canceller using the adaptive filter, the sending input signal z[n] is equalized to the sending output signal $z_{OUT}[n]$ of the echo canceller, and the acoustic coupling $|H(\omega)|^2$ further including the process of the echo canceller is estimated.

Figure 10:
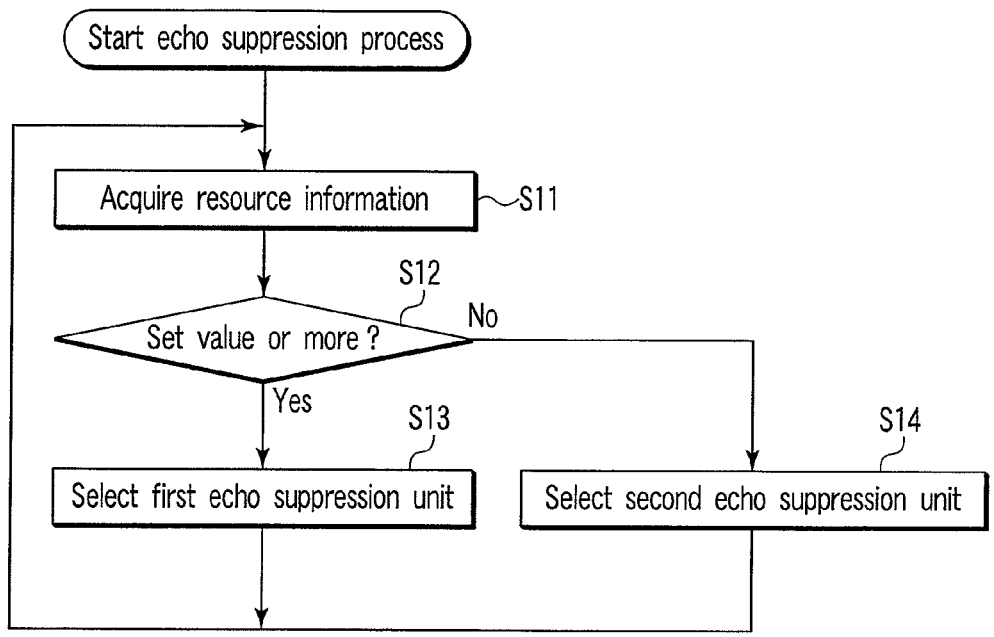
FIG. 10 is an exemplary flowchart showing the steps of the echo suppression process according to the first embodiment.

Next, the control operation of the control unit 202 will be explained with reference to the flowchart of FIG. 10.

First, the resource monitor unit 201 monitors the resources. The resource monitor unit 201 transmits the resource amount obtained by monitoring to the control unit 202. The control unit 202 determines whether or not the resource amount received is more than a predetermined value. Incidentally, the description that follows deals with a case in which the resource monitor unit 201 monitors the availability of the CPU 102.

The control unit 202 periodically acquires the amount of the system resources from the resource monitor unit 201 (step S11), and determines whether or not the system resource amount acquired is not more than a set value or, for example, whether the availability of the CPU 102 is not more than 80% (step S12).

Upon determination that the availability of the CPU 102 is not more than 80% (YES in step S12), the control unit 202 selects the echo suppression process using the first echo suppression unit 203 (step S13). Upon determination that the availability of the CPU 102 is more than 80% (NO in step S12), on the other hand, the control unit 202 selects the echo suppression process using the second echo suppression unit 204 with lighter computational load on the CPU 102 (step S14).

Although this embodiment represents a case in which the echo canceller is a time-domain adaptive filter, the process may alternatively be executed by a frequency-domain adaptive filter.

According to this embodiment, as long as the resources are not in shortage, the echo is suppressed by the first echo suppression unit 203 with heavy computational load on the CPU 102 and low robustness against the sync fluctuation between the received input signal x[n] and the sending input signal z[n]. In the case where the resources are in shortage, on the other hand, the echo is suppressed by the second echo suppression unit 204 with light computational load on the CPU 102 and high robustness against the sync fluctuation between the received input signal x[n] and the sending input signal z[n].

Generally, according to the echo suppression processing method in which the robustness is low against the sync fluctuation between the received input signal x[n] and the sending input signal z[n], the computational load is increased but the sending speech is less deteriorated, thereby improving the speech quality. In the case where the system resources run short, rather than by executing the echo suppression process according to the echo suppression processing method with low robustness against the sync fluctuation and generating such noise by the sync fluctuation, another echo suppression processing method with higher robustness against the sync fluctuation should be employed, thereby making it possible to improve the overall speech quality since that such noise occurs due to the sync fluctuation can be prevented in spite of the somewhat increased deterioration of the sending speech. Also, in the case where the system resources are in shortage, the probability of that jarring and unnecessary noise occurs due to the sync fluctuation can be reduced and the disconnection of the voice telephone call service can be avoided by switching to another echo suppression processing method with light computational load.

Specifically, in the case where the system resources are in shortage, the process is switched to the second echo suppression unit 204 with lighter computational load on the CPU 102 and higher robustness against the sync fluctuation. In this way, that such noise occurs in the sending output signal $z_{OUT}[n]$ can be prevented, thereby improving the overall speech quality.

Incidentally, the control unit 202 may display on the LCD that the echo suppression processing method has been changed or the system resources run short. By making this display, the user can be urged to secure the system resources.

In the resource monitor unit shown in FIG. 4, for example, the suppression process is switched at 90% of the consumption of the memory 114 as well as by reference to the availability of the CPU 102. In the resource monitor unit shown in FIG. 5, the suppression process is switched when the residual capacity of the battery 125A reaches 10%, for example, as well as by reference to the availability of the CPU 102.

By doing so, the computational load on the CPU 102 and the processing load on the memory 114 can be reduced while at the same time preventing that such noise occurs in the sending output signal which otherwise might be caused by the residual capacity of the battery 125.

Figure 11:
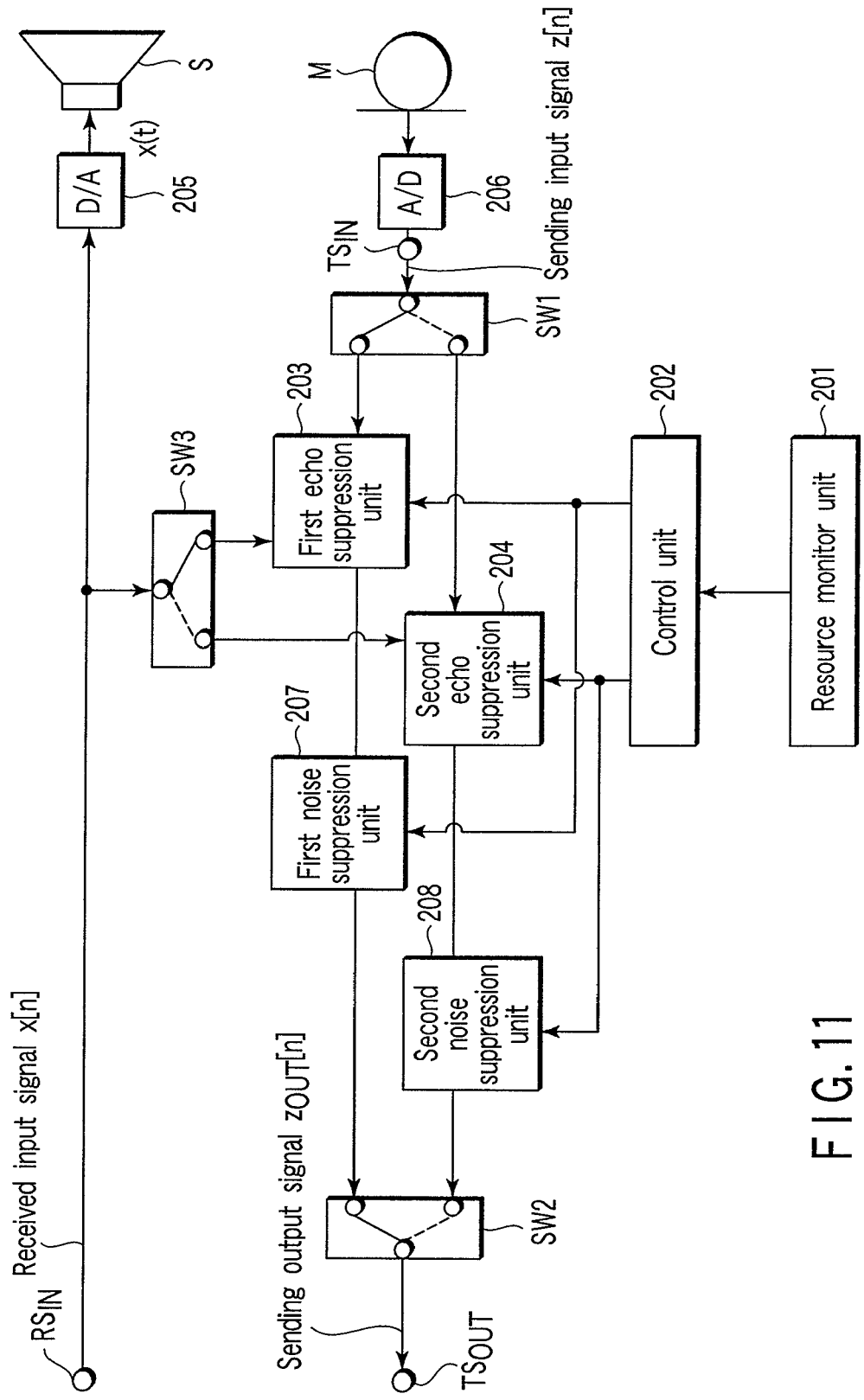
FIG. 11 is an exemplary block diagram showing the configuration of the echo suppression unit according to a modification of the first embodiment.

An explanation will be given about a case in which the noise suppression process is executed by the noise suppression unit in addition to the echo suppression units 203, 204 as shown in FIG. 11. The process with the noise suppression is described as a conventional technique in, for example, Jpn. Pat. Appln. KOKAI Publication No. 2003-140700. The first noise suppression unit 207 executes the noise suppression process in the case where the resources are not in short supply, while the second noise suppression unit 208 executes the noise suppression process in the case where the resources run short. In the case where the resources run short, the second noise suppression unit 208 may suppress the noises rather strongly with the processing capacity almost equal to the case where the resources are not in short supply or more simply with lighter computational load than in the case where the resources are not in short supply. Also by doing so, the computational load on the CPU 102 and the processing load on the memory 114 can be reduced and that jarring and unnecessary noise occurs which otherwise might be caused in the sending output signal due to the residual capacity of the battery 125A can be prevented.

In the embodiment described below, an example of the echo suppression unit will be explained. The determination process of the control unit 202 is similar to the determination process explained above with reference to the flowchart of FIG. 11 and not described again.

Second Embodiment

FIG. 12 is a block diagram showing the configuration of the echo suppression unit according to a second embodiment of the invention.

The signal processing is executed by software. Therefore, the switches SW1 to SW5 in FIG. 12, though nonexistent in real terms, are shown to indicate the difference in signal flow.

First, the signal processing in the case where the resources are not in shortage will be explained. In the case where the resources are not in short supply, the signals pass along the solid lines in the switches SW1 to SW5. The sending input signal z(t) in analog form input from the microphone M (including the sending speech signal s(t) constituting the voice of the near-end speaker, the echo component b(t) due to the signal output from the speaker S and reaching the microphone M by acoustic coupling, and the noise component n(t)

of the surrounding noises) is input to the A/D converter 206 for converting the analog signal into a digital signal and output as a sending input signal z[n]. The sending input signal z[n] is output as a sending output signal $z_{OUT}$[n] through the echo canceller or the first echo suppression unit 203 with the echo canceller and the echo reduction combined.

Also, the received input signal x[n] is input to the second echo suppression unit 204 for executing the echo cancel process through the adaptive filter or a combination of the frequency-domain echo reduction process and the echo cancel process. Also, the received input signal x[n] is directly input to the D/A converter 205 and output from the speaker S.

Next, an explanation will be given about the signal processing with the resources in short supply. In the case where the resources are in shortage, the signals are passed along the dashed lines in the switches SW1 to SW5.

The sending input signal z[n] is output as a sending output signal $z_{OUT}$[n] through a first loss insertion unit 231 constituting a part of a voice switch (VS) 230. Also, the sending input signal z[n] is input to a voice activity detector (VAD) 233 constituting a part of the voice switch 230.

The received input signal x[n] is output from the speaker S through a second loss insertion unit 232 and a D/A converter. Also, the received input signal x[n] is input to the VAD 233 constituting a part of the voice switch 230.

The voice switch 230 is intended to constantly give what is called the loss as predetermined to acoustic path in the speech signal processing system and normally has the function of reducing the gain of the received input signal x[n] or the sending input signal z[n] in the communication terminal. The process with the voice switch is described as a conventional technique in, for example, U.S. Pat. No. 3,466,050.

The VAD 233 detects whether a voice of the far-end speaker is contained in the received input signal x[n] or whether a voice (sending speech signal s[n]) of the near-end speaker is contained in the sending input signal z[n]. In the case where the VAD 233 detects the received voice activity and determines that only the far-end speaker is speaking, then the first loss insertion unit 231 is controlled to give the loss to the sending input signal z[n]. Upon detection of the presence of the sending voice activity and determination that only the near-end speaker is speaking, on the contrary, the second loss insertion unit 232 is controlled to give the loss to the received input signal x[n]. In the double-talk state with both the received voice activity and the sending voice activity existent or the no speech state (neither the received voice activity nor the sending voice activity is existent), on the other hand, the first loss insertion unit 231 and the second loss insertion unit 232 are controlled in such a manner as to give one half of a predetermined loss to each signal, give the loss to the sending input signal z[n] or give the loss to the received input signal x[n] or the sending input signal z[n] while keeping the state as of the immediately preceding time (only the received voice activity or only the sending voice activity is existent).

According to this embodiment, as long as the resources are not in short supply, the echo is suppressed by the first echo suppression unit 203 with heavy computational load on the CPU 102 and low robustness against the sync fluctuation between the received input signal x[n] and the sending input signal z[n]. In the case where the resources are in short supply, on the other hand, the echo is reduced by the voice switch 230 with light computational load on the CPU 102 and higher robustness against the sync fluctuation between the received input signal x[n] and the sending input signal z[n].

Generally, the echo suppression processing method with lower robustness against the sync fluctuation between the received input signal x[n] and the sending input signal z[n], though with heavy computational load, improves the speech quality due to a smaller deterioration of the sending speech. In the case where the system resources are in short supply, the echo suppression process should be switched from the method with lower robustness against the sync fluctuation causing the generation of jarring and unnecessary noises to another echo suppression processing method with higher robustness against the sync fluctuation. In this way, though somewhat larger in the deterioration of the sending speech, jarring and unnecessary noises which otherwise might be generated by the sync fluctuation are less likely to occur. From the overall point of view, therefore, the speech quality can be improved. Also, in the case where the system resources are in short supply, the probability of that such noise occurs due to the sync fluctuation can be reduced and the disconnection of the voice telephone call service can be avoided by switching to another echo suppression processing method with lighter computational load.

Specifically, in the case where the system resources are in short supply, that such noise occurs in the sending output signal $z_{OUT}$[n] can be prevented and the speech quality improved from the overall point of view, by switching to the process with the voice switch 230 with lighter computational load on the CPU 102 and higher robustness against the sync fluctuation.

Incidentally, the first echo suppression unit 203 may be used as an echo reduction in frequency domain while the second echo suppression unit 204 as a voice switch, or the first echo suppression unit 203 as an echo canceller with an adaptive filter while the second echo suppression unit 204 a combination of the frequency-domain echo reduction and the voice switch, or the first echo suppression unit 203 is used as a combination of the echo canceller with the adaptive filter and the frequency-domain echo reduction while the second echo suppression unit 204 as a combination of the frequency-domain echo reduction and the voice switch. Further, a plurality of the constituent elements disclosed in the embodiments described above may be combined appropriately.

In the case where the system resources are in short supply even in these methods, that such noise occurs in the sending output signal can be prevented and the speech quality can be improved as a whole by switching to the echo suppression processing method with light computational load on the CPU 102 and high robustness against the sync fluctuation.

Third Embodiment

Figure 13:
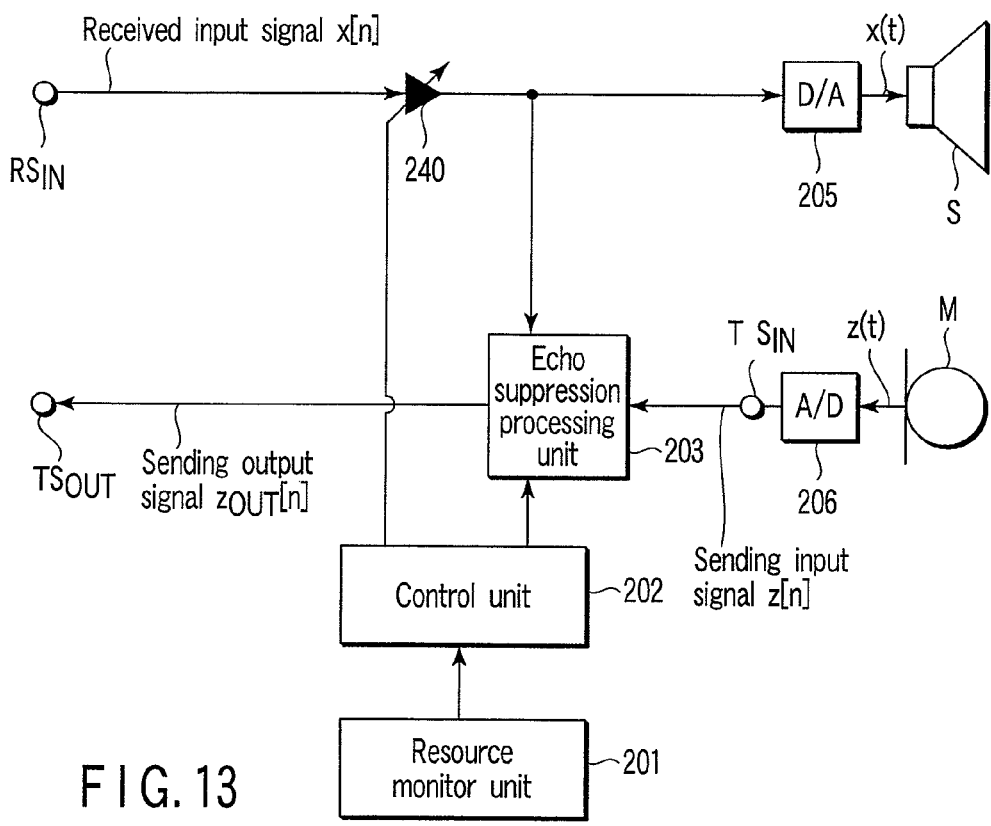
FIG. 13 is an exemplary block diagram showing the configuration of an echo suppression unit according to a third embodiment.

FIG. 13 is a block diagram showing the configuration of the echo suppression unit according to a third embodiment of the invention.

According to this embodiment, in the case where the resources are not in short supply, the control unit 202 causes the echo suppression unit 203 to suppress the echo. In the case where the resources are in short supply, on the other hand, the control unit 202 stops the process of the echo suppression unit 203 and reduces the echo by inserting the loss in the received input signal x[n] by the process of a received loss insertion unit 240.

According to this embodiment, in the case where the resources are not in short supply, the echo is suppressed by the echo suppression unit 203 with heavy computational load on the CPU 102 and low robustness against the sync fluctuation between the received input signal x[n] and the sending input signal z[n]. In the case where the resources are in short supply, on the other hand, the echo is suppressed by the received loss insertion unit 240 with light computational load on the CPU 102 and high robustness against the sync fluctuation between the received input signal x[n] and the sending input signal z[n].

Generally, the echo suppression processing method with low robustness against the sync fluctuation between the received input signal x[n] and the sending input signal z[n], though with heavy computational load, improves the speech quality due to the small deterioration of the sending speech. In the case where the system resources are in short supply, that jarring and unnecessary noise occurs due to the sync fluctuation can be prevented and the speech quality improved as a whole by switching from the echo suppression processing method with low robustness against the sync fluctuation to another echo suppression processing method which, though somewhat increased in the deterioration of the sending speech quality, is higher in the robustness against the sync fluctuation. Also, in the case where the system resources are in short supply, the probability of that such noise occurs due to the sync fluctuation can be reduced and the disconnection of the voice telephone call service can be avoided by switching to another echo suppression processing method with lighter computational load.

Specifically, in the case where the system resources are in short supply, that such noise occurs in the sending output signal can be prevented and the overall speech quality improved by switching to the loss insertion process with lighter computational load on the CPU 102 and higher robustness against the sync fluctuation.

Figure 14:
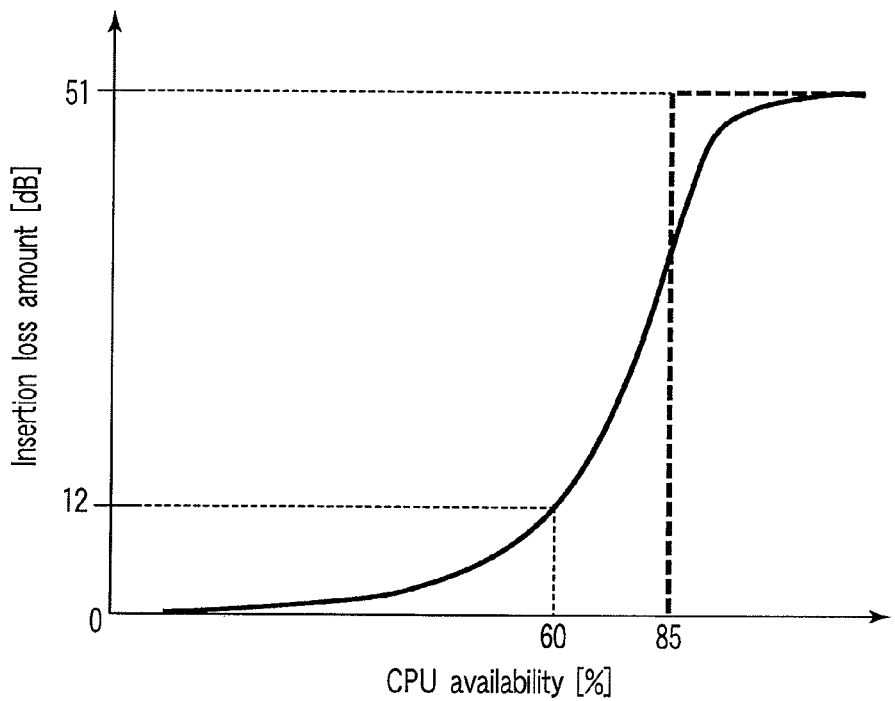
FIG. 14 shows an example of loss insertion according to the third embodiment.

Incidentally, an example of the loss insertion amount in the received loss insertion unit 240 is shown in FIG. 14. As shown in FIG. 14, the loss insertion amount may be switched discontinuously as indicated by dashed lines, or continuously as indicated by solid line.

Figure 15:
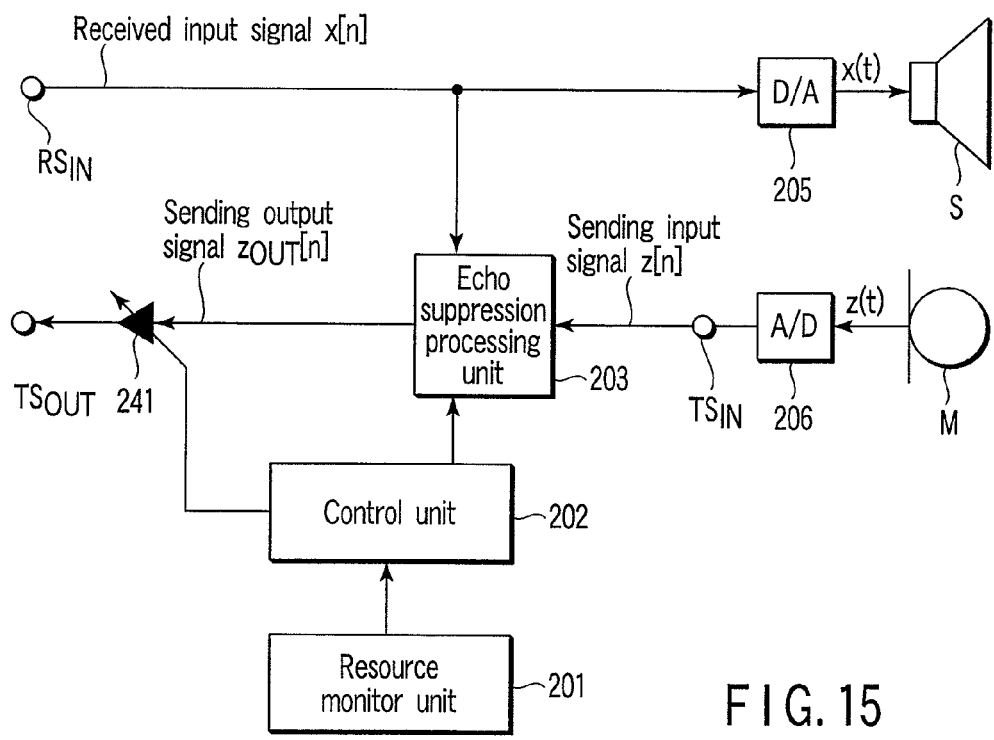
FIG. 15 is an exemplary block diagram showing the configuration of the echo suppression unit according to a modification of the third embodiment.

In the case where the resources are in short supply, as shown in FIG. 15, the sending output signal $z_{OUT}[n]$ may be given the loss by a sending loss insertion unit 241 instead of by the received loss insertion unit 240. Also, as shown in FIG. 16, both the received input signal x[n] and the sending output signal $z_{OUT}[n]$ may be given the loss by the received loss insertion unit 240 and the sending loss insertion unit 241.

In these cases, assume that the system resources are in short supply. That such noise occurs in the sending output signal can be prevented and the overall speech quality improved by switching to a process including the sending loss insertion unit 241 with lighter computational load on the CPU 102 and higher robustness against the sync fluctuation.

Fourth Embodiment

FIG. 17 is a block diagram showing the configuration of the echo suppression unit according to a fourth embodiment of the invention.

The received input signal x[n] is output from a speaker through a received mute unit 251 and a D/A converter.

According to this embodiment, in the case where the resources are not in short supply, the control unit 202 suppresses the echo through the echo suppression unit 203 without the operation of the received mute unit 251. In the case where the resources are in short supply, on the other hand, the control unit 202 stops the process of the echo suppression unit 203 and mutes the received input signal x[n] through the process of the received mute unit 251 thereby to reduce the echo.

According to this embodiment, in the case where the resources are not in short supply, the echo is suppressed by the echo suppression unit 203 with heavy computational load on the CPU 102 and low robustness against the sync fluctuation between the received input signal x[n] and the sending input signal z[n]. In the case where the resources are in short supply, on the other hand, the echo is reduced by the received mute unit 251 with lighter computational load on the CPU 102 and higher robustness against the sync fluctuation between the received input signal x[n] and the sending input signal z[n].

Generally, the echo suppression processing method with low robustness against the sync fluctuation between the received input signal x[n] and the sending input signal z[n], though increased in the computational load, improves the speech quality due to the smaller deterioration of the sending speech. In the case where the system resources are in short supply, that jarring and unnecessary noise occurs due to the sync fluctuation can be prevented and the speech quality improved as a whole by the echo suppression processing method with higher robustness against the sync fluctuation, though somewhat increased in the deterioration of the sending speech quality, rather than by the echo suppression processing method with low robustness against the sync fluctuation which generates such noise due to the sync fluctuation. Also, in the case where the system resources are in short supply, the probability of that such noise occurs due to the sync fluctuation can be reduced and the disconnection of the voice telephone call service can be avoided by switching to another echo suppression processing method with lighter computational load.

Specifically, in the case where the system resources are in short supply, that such noise occurs in the sending output signal can be prevented and the overall speech quality improved by switching to the received mute unit 251 with lighter computational load on the CPU 102 and higher robustness against the sync fluctuation.

Figure 18:
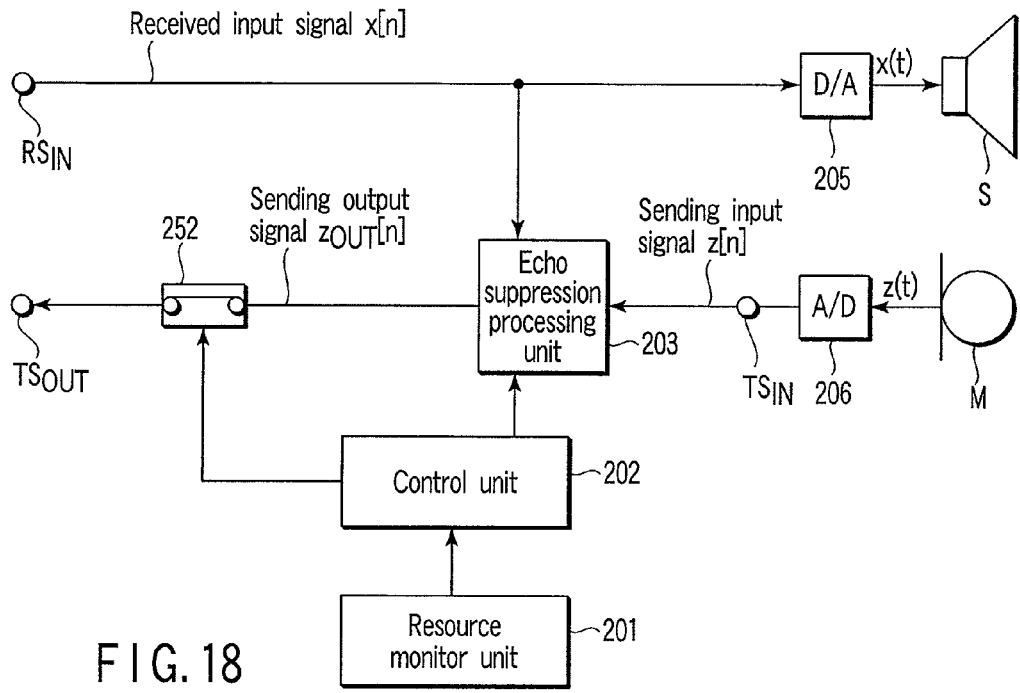
FIG. 18 is an exemplary block diagram showing the configuration of the echo suppression unit according to a modification of the fourth embodiment.
Figure 19:
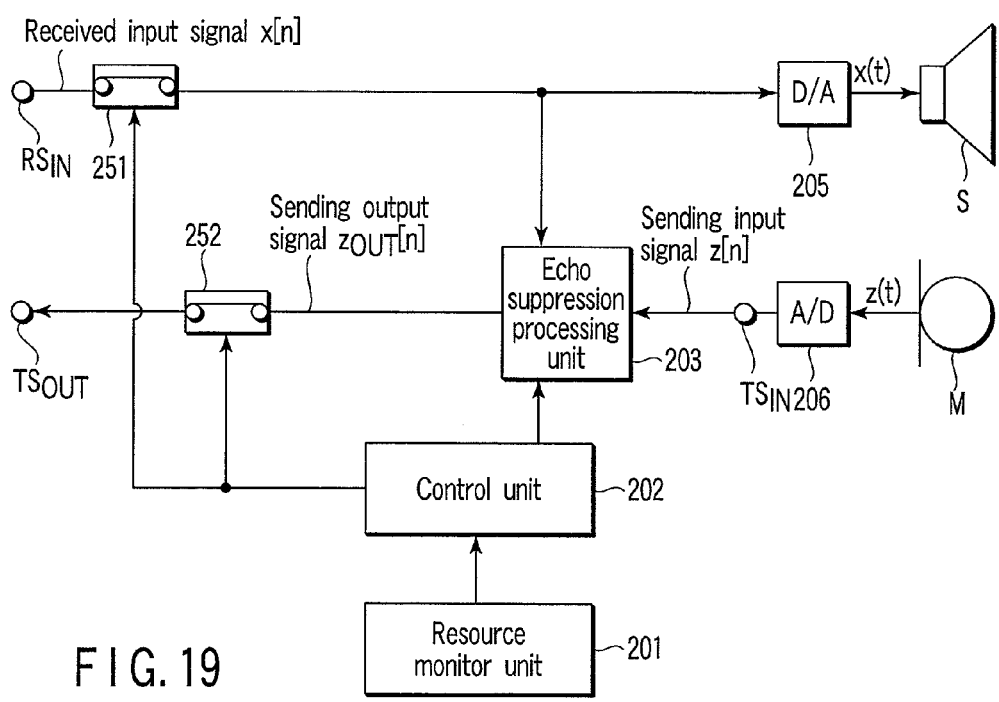
FIG. 19 is an exemplary block diagram showing the configuration of the echo suppression unit according to a modification of the fourth embodiment.

In the case where the resources are in short supply, as shown in FIG. 18, the sending output signal $z_{OUT}[n]$ may be given the loss by the sending mute unit 252 instead of by the received mute unit 251. Also, as shown in FIG. 19, both the received input signal x[n] and the sending output signal $z_{OUT}[n]$ may be muted by the received mute unit 251 and the sending mute unit 252.

In these cases, assume that the system resources are in short supply. By switching to the process including the sending mute unit 252 with lighter computational load on the CPU 102 and higher robustness against the sync fluctuation, that such noise occurs in the sending output signal can be prevented and the overall speech quality improved.

Fifth Embodiment

Figure 20:
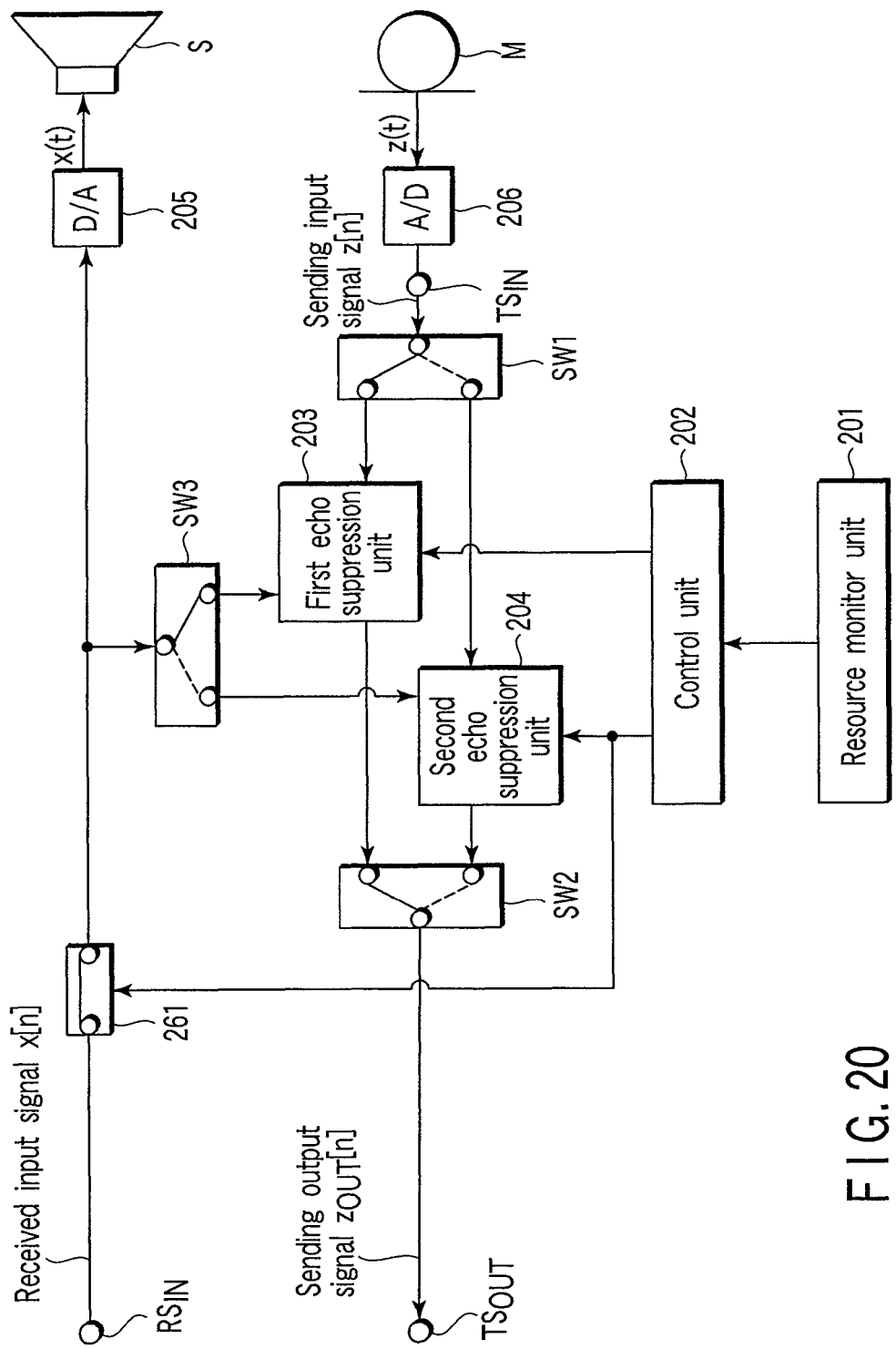
FIG. 20 is an exemplary block diagram showing the configuration of an echo suppression unit according to a fifth embodiment.

FIG. 20 is a block diagram showing the configuration of the echo suppression unit according to a fifth embodiment of the invention.

According to this embodiment, as in the first embodiment, assume that the resources are not in short supply. The echo is suppressed by the first echo suppression unit 203 with heavier computational load on the CPU 102 and lower robustness against the sync fluctuation between the received input signal x[n] and the sending input signal z[n]. In the case where the resources are in short supply, on the other hand, the echo is suppressed by the second echo suppression unit 204 with lighter computational load on the CPU 102 and higher robustness against the sync fluctuation between the received input signal x[n] and the sending input signal z[n].

Further, according to this embodiment, assume that the resources are in short supply. The received input signal x[n] is muted by the received mute unit 261 with higher robustness against the sync fluctuation between the received input signal x[n] and the sending input signal z[n].

Generally, the echo suppression processing method with low robustness against the sync fluctuation between the received input signal x[n] and the sending input signal z[n], though increased in the computational load, improves the speech quality due to the small deterioration of the sending speech. In the case where the system resources are in short supply, that jarring and unnecessary noise occurs due to the sync fluctuation can be prevented and the speech quality improved as a whole by switching to the echo suppression processing method with higher robustness against the sync fluctuation, though somewhat increased in the deterioration of the sending speech quality, from the echo suppression processing method with low robustness against the sync fluctuation which generates such noise due to the sync fluctuation. Also, in the case where the system resources are in short supply, the probability of that such noise occurs due to the sync fluctuation can be reduced and the disconnection of the voice telephone call service can be avoided by switching to another echo suppression processing method with lighter computational load.

Specifically, in the case where the system resources are in short supply, that such noise occurs in the sending output signal can be prevented and the overall speech quality improved by switching to the process of the second echo suppression unit 204 and the received mute unit 261 with lighter computational load on the CPU 102 and higher robustness against the sync fluctuation.

Figure 21:
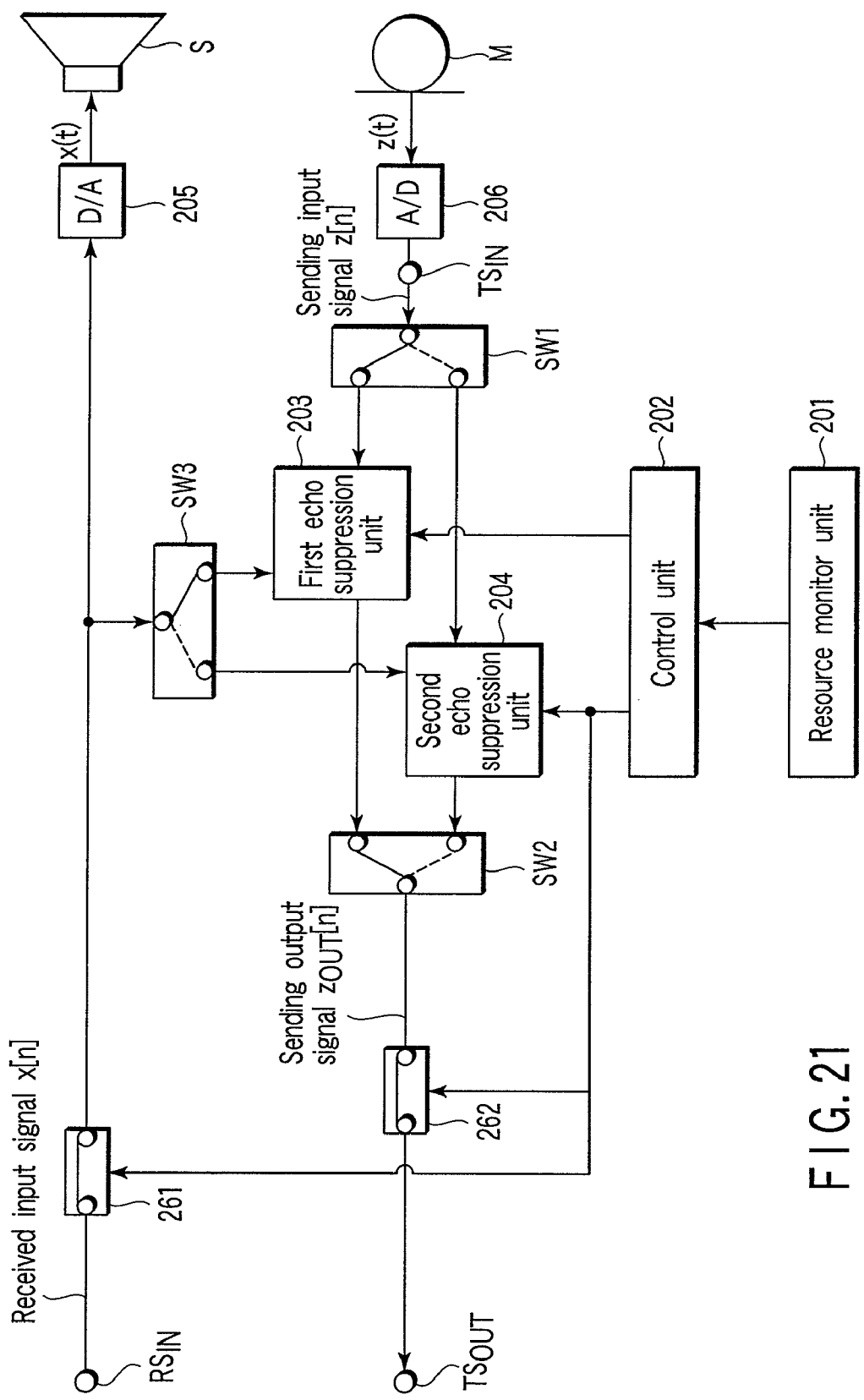
FIG. 21 is an exemplary block diagram showing the configuration of the echo suppression unit according to a modification of the fifth embodiment.

Incidentally, in the case where the resources are in short supply, as shown in FIG. 21, the process of muting the sending output signal $z_{OUT}[n]$ may be executed by the sending mute unit 262 in addition to the process of muting the received input signal x[n].

Also, in the case where the resources are in short supply, as shown in FIG. 22, the process of muting the sending output signal $z_{OUT}[n]$ may be executed by the sending mute unit 262 instead of the process of muting the received input signal x[n] by the received mute unit 261.

In these cases, assume that the system resources are in short supply. By switching to the process including the sending mute unit 262 with lighter computational load on the CPU 102 and higher robustness against the sync fluctuation, that such noise occurs in the sending output signal can be prevented and the overall speech quality improved.

Sixth Embodiment

FIG. 23 is a block diagram showing the configuration of the echo suppression unit according to a sixth embodiment of the invention.

According to this embodiment, like in the first embodiment, assume that the resources are not in short supply. The echo is suppressed by the first echo suppression unit 203 with heavier computational load on the CPU 102 and lower robustness against the sync fluctuation between the received input signal x[n] and the sending input signal z[n]. In the case where the resources are in short supply, on the other hand, the echo is suppressed by the second echo suppression unit 204 with lighter computational load on the CPU 102 and higher robustness against the sync fluctuation between the received input signal x[n] and the sending input signal z[n].

Further, assume that the resources are in short supply. According to this embodiment, the loss is inserted into the received input signal x[n] by a received loss insertion unit 271 with higher robustness against the sync fluctuation between the received input signal x[n] and the sending input signal z[n].

Generally, the echo suppression processing method with low robustness against the sync fluctuation between the received input signal x[n] and the sending input signal z[n], though increased in the computational load, improves the speech quality due to the small deterioration of the sending speech. In the case where the system resources are in short supply, that jarring and unnecessary noise occurs due to the sync fluctuation can be prevented and the speech quality improved as a whole by switching to the echo suppression processing method with higher robustness against the sync fluctuation, though somewhat increased in the deterioration of the sending speech quality, from the echo suppression processing method with low robustness against the sync fluctuation which generates such noise due to the sync fluctuation. Also, in the case where the system resources are in short supply, the probability of that such noise occurs due to the sync fluctuation can be reduced and the disconnection of the voice telephone call service can be avoided by switching to another echo suppression processing method with lighter computational load.

Specifically, in the case where the system resources are in short supply, that such noise occurs in the sending output signal can be prevented and the overall speech quality improved by switching to the second echo suppression unit 204 and the received loss insertion unit 271 with lighter computational load on the CPU 102 and higher robustness against the sync fluctuation.

Incidentally, as shown in FIG. 24, assume that the resources are in short supply. In addition to the process of inserting the loss into the received input signal x[n], the process of inserting the loss into the sending output signal $z_{OUT}[n]$ may be executed by a sending loss insertion unit 272.

Also, as shown in FIG. 25, consider a case in which the resources are in short supply. Instead of the process of inserting the loss into the received input signal x[n] by the received loss insertion unit 271, the process of inserting the loss into the sending output signal $z_{OUT}[n]$ may be executed by the sending loss insertion unit 272.

In these cases, if the system resources are in short supply, that such noise occurs in the sending output signal can be prevented and the speech quality improved as a whole by switching to the process including the sending loss insertion unit 272 with lighter computational load on the CPU 102 and higher robustness against the sync fluctuation.

Seventh Embodiment

FIG. 26 is a block diagram showing the configuration of the echo processing unit according to a seventh embodiment of the invention.

According to this embodiment, consider a case in which the resources are not in short supply. The echo is suppressed by a first echo processing unit 291 with heavier computational load on the CPU 102 and lower robustness against the sync fluctuation between the received input signal x[n] and the sending input signal z[n]. In the case where the resources are in short supply, on the other hand, the echo is suppressed by a second echo processing unit 292 with lighter computational load on the CPU 102 and higher robustness against the sync fluctuation between the received input signal x[n] and the sending input signal z[n].

FIG. 27 is a block diagram showing the configuration of the first echo processing unit. The first echo processing unit 291 includes a first echo suppression unit 203, a first sync detection unit 281, a first received buffer 282 and a first sending buffer 283. The first echo suppression unit 203 is similar to the corresponding unit of the first embodiment and not described again.

The first received buffer 282 stores the received input signal x[n] for a predetermined time and outputs it to the first sync detection unit 281. The first sending buffer 283 stores the sending input signal z[n] for a predetermined time and outputs it to the first sync detection unit 281.

The first sync detection unit 281, by comparing the received input signal x[n] acquired from the first received buffer 282 with the sending input signal z[n] acquired from the first sending buffer 283 by calculating the cross-correlation, for example, calculates the delay amount of the received input signal x[n] behind the sending input signal z[n] and outputs the received input signal x[n] synchronized with the sending input signal z[n] to the first echo suppression unit 203.

Figure 28:
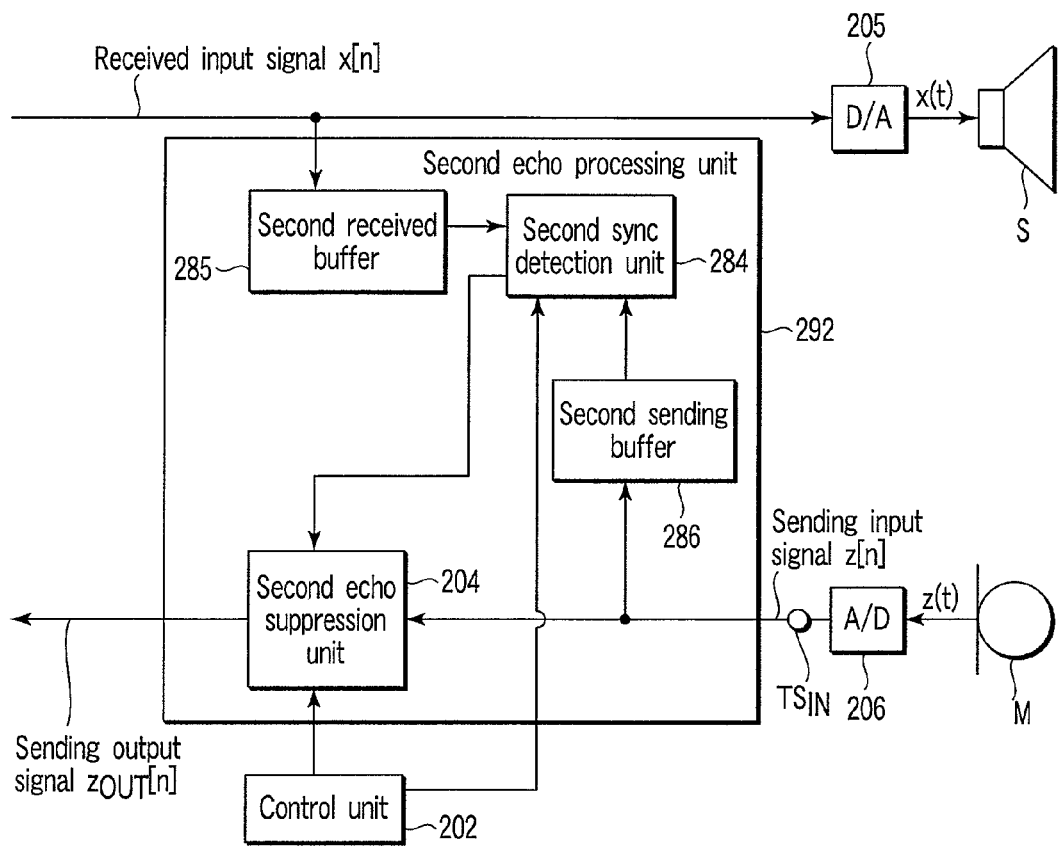
FIG. 28 is an exemplary block diagram showing the configuration of a second echo processing unit shown in FIG. 26.

FIG. 28 is a block diagram showing the configuration of the second echo processing unit 292. The second echo processing unit 292 includes a second echo suppression unit 204, a second sync detection unit 284, a second received buffer 285 and a second sending buffer 286. The second echo suppression unit 204 is similar to the corresponding one in the first embodiment and therefore not described again.

The second received buffer 285 stores the received input signal x[n] for a predetermined time and outputs it to the second sync detection unit 284. The second sending buffer 286 stores the sending input signal z[n] for a predetermined time and outputs it to the second sync detection unit 284.

The second sync detection unit 284, by comparing the received input signal x[n] acquired from the second received buffer 285 with the sending input signal z[n] acquired from the second sending buffer 286 by calculating the cross-correlation, for example, calculates the delay amount of the received input signal x[n] behind the sending input signal z[n] and outputs the received input signal x[n] synchronized with the sending input signal z[n] to the second echo suppression unit 204. Incidentally, the second sync detection unit 284 may execute the process with a smaller calculation amount than the first sync detection unit 281 by calculating the cross-correlation between the signals obtained by thinning the received input signal x[n] acquired from the second received buffer 285 and the sending input signal z[n] acquired from the second sending buffer 286, respectively.

In the case where the resources are in short supply, the timing of acquiring the received input signal x[n] and the sending input signal z[n] from the memory 114 may be shifted, often adversely affecting the ability of the second echo suppression unit 204 to suppress the echo. In such a case, the second received buffer 285 storing the received input signal x[n] and the second sending buffer 286 storing the sending input signal z[n] in the second echo processing unit 292 are cleared. In order not to clear these buffers too frequently, a certain time interval is inserted by appropriately setting the hangover time corresponding to the degree of shortage of the resources. By clearing (initializing) these buffers, the acquisition timing of the received input signal x[n] and the sending input signal z[n] are reset, so that the timing of acquiring the received input signal x[n] and the sending input signal z[n] from the memory 114 are equalized, thereby making it possible to prevent the reduction in the ability of the second echo suppression unit 204 to suppress the echo. Specifically, in the case where the resources are in short supply, the robustness of the second echo processing unit 292 against the sync fluctuation between the received input signal x[n] and the sending input signal z[n] can be increased by clearing the second received buffer 285 and the second sending buffer 286.

Also, in the case where the resources are in short supply, the control unit causes the sending insertion unit 241 to start the process and insert the loss into the sending output signal $z_{OUT}[n]$ constituting an output signal of the second echo suppression unit 204.

According to this embodiment, the shift of the acquisition timing of the signals due to the shortage of the resources can be reset and thus the timing can be equalized, thereby making it possible to prevent the reduction in the ability to suppress the echo.

In the case where the system resources are in short supply, that jarring and unnecessary noise occurs due to the sync fluctuation can be prevented and the overall speech quality improved by switching to another echo suppression processing method with higher robustness against the sync fluctuation. Also, in the case where the system resources are in short supply, the probability of that such noise occurs due to the sync fluctuation can be reduced and the disconnection of the voice telephone call service can be avoided by switching to another echo suppression processing method with lighter computational load.

Specifically, in the case where the system resources are in short supply, that such noise occurs in the sending output signal can be prevented for an improved overall speech quality by switching to the process of the second echo processing unit 292 and the sending loss insertion unit 241 with lighter computational load on the CPU 102 and higher robustness against the sync fluctuation.

Incidentally, according to the aforementioned embodiments, the entire process of suppressing the echo is implemented according to a computer program, and therefore, the advantages similar to those of this embodiment can be realized easily by simply installing the computer program in the normal computer through a computer-readable storage medium. Also, this computer program can be executed not only by the personal computer but also by the various electronic devices having built the processor therein.

The embodiments described above are so configured that the echo generated by the received input signal x[n] reaching, by acoustic coupling, the sending input signal z[n] output from the near-end speaker is suppressed from the sending input signal z[n] with reference to the received input signal x[n]. As an alternative, a configuration may be employed in which the echo generated by the feedback of the sending output signal at the far end not shown may be suppressed from the received input signal x[n] with reference to the sending output signal.

In the aforementioned embodiments, the method of suppressing the echo is selected from the two processing methods in accordance with the amount of the system resources. Nevertheless, one or a plurality of echo suppression processing methods may be selected from three or more processing methods in accordance with the amount of the system resources.

In the embodiments described above, the echo suppression processing method is switched in two stages in accordance with the amount of the resources. Nevertheless, the echo suppression processing method may be switched in three or more stages in accordance with the amount of the system resources.

Also, in the embodiments described above, the echo suppression processing method is selected in accordance with the amount of the resources. Nevertheless, the noise suppression processing method may be selected in accordance with the amount of the system resources.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
 a first signal input unit configure to receive a first input signal;
 a second signal input unit configure to receive a second input signal;
 a first control unit configure to acquire system resources;
 a second control unit configure to select, based at least in part on information of the system resources acquired by the first control unit, a processing method for suppressing at least one of echo and noise of the second input signal input from the second signal input unit containing the echo due to the first input signal input from the first signal input unit;
 a third control unit configure to generate an output signal at least in part by suppressing at least one of the echo and the noise from the second input signal using the processing method selected by the second control unit; and
 a signal output unit configure to output the output signal generated by the third control unit,
 wherein the second control unit is configured to select a first echo suppression process in the case where an amount of the system resources is not less than a predetermined value, and to select a second echo suppression process with a smaller processing load than the first echo suppression process in the case where the amount of the system resources is not more than the predetermined value.

2. The information processing apparatus of claim 1,
 wherein the first echo suppression process comprises one of an echo cancellation process using an adaptive filter and an echo reduction process of frequency domain type.

3. The information processing apparatus of claim 1,
 wherein the second echo suppression process comprises one of an echo reduction process of frequency domain type, a process using a voice switch, a process for inserting a loss and a process of muting.

4. The information processing apparatus of claim 1,
 wherein the first input signal comprises a received signal from a far-end speaker, and
 the second input signal comprises a sending signal collected by a microphone from a near-end speaker.

5. The information processing apparatus of claim 1,
 wherein the information of the system resources is at least one of a processing load of a processor, a processing load of a memory device and a remaining capacity of a battery.

6. A method for suppressing at least one of echo and noise in a signal, comprising:
 causing a computer to acquire information of system resources;
 causing the computer to select, in accordance with the acquired information of the system resources, a processing method for suppressing at least one of the echo and the noise of a second input signal containing the echo due to a first input signal; and
 causing the computer to suppress at least one of the echo and the noise from the second input signal using the selected processing method and generating an output signal,
 wherein causing the computer to select a processing method comprises causing the computer to execute the processes of:
 selecting a first echo suppression process in the case where an amount of the system resources is not less than a predetermined value; and
 selecting a second echo suppression process smaller in a processing load than the first echo suppression process in the case where the amount of the system resources is not more than the predetermined value.

7. The method of claim 6,
 wherein the first echo suppression process comprises one of an echo cancellation process using an adaptive filter and an echo reduction process of frequency domain type.

8. The method of claim 6,
 wherein the second echo suppression process comprises one of an echo reduction process of frequency domain type, a process using a voice switch and a process for inserting a loss and a process of muting.

9. The method of claim 6,
 wherein the first input signal comprises a received signal from a far-end speaker and the second input signal comprises a sending signal collected by a microphone from a near-end speaker.

10. The method of claim 6,
 wherein the information of the system resources is at least one of a processing load on a processor included in the computer, a processing load on a memory device and a remaining capacity of a battery.

* * * * *